United States Patent
Tokuchi

(12) 
(10) Patent No.: US 10,792,819 B2
(45) Date of Patent: Oct. 6, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 393 days.

(21) Appl. No.: 15/916,242

(22) Filed: Mar. 8, 2018

(65) Prior Publication Data

US 2019/0054628 A1 Feb. 21, 2019

(30) Foreign Application Priority Data

Aug. 16, 2017 (JP) .................. 2017-157098

(51) Int. Cl.
| | | |
|---|---|---|
| G06F 17/00 | (2019.01) | |
| B25J 13/00 | (2006.01) | |
| G05B 19/409 | (2006.01) | |
| B25J 9/16 | (2006.01) | |
| B25J 13/08 | (2006.01) | |
| B25J 19/02 | (2006.01) | |

(52) U.S. Cl.
CPC ........... *B25J 13/006* (2013.01); *B25J 9/1669* (2013.01); *B25J 13/081* (2013.01); *B25J 13/084* (2013.01); *B25J 13/087* (2013.01); *B25J 19/023* (2013.01); *G05B 19/409* (2013.01)

(58) Field of Classification Search
CPC ...... B25J 13/006; B25J 9/1669; B25J 13/081; B25J 13/084; B25J 13/087; B25J 19/023; G05B 19/409
USPC ........................................ 700/248
See application file for complete search history.

(56) References Cited

U.S. PATENT DOCUMENTS

| | | | |
|---|---|---|---|
| 2016/0046025 A1 | 2/2016 | Miyashita et al. | |
| 2018/0021094 A1* | 1/2018 | Matsuda ................ | A61B 90/50 600/102 |
| 2019/0019423 A1* | 1/2019 | Choi ..................... | G08G 5/0039 |
| 2019/0258531 A1* | 8/2019 | Tokuchi ................ | G06F 9/4843 |
| 2019/0258532 A1* | 8/2019 | Tokuchi ................ | G06F 9/542 |
| 2019/0260832 A1* | 8/2019 | Tokuchi ................ | H04L 67/125 |
| 2019/0377521 A1* | 12/2019 | Tokuchi ................ | G06F 3/167 |

FOREIGN PATENT DOCUMENTS

| | | |
|---|---|---|
| JP | 2005111637 | 4/2005 |
| JP | 2014188597 | 10/2014 |

* cited by examiner

*Primary Examiner* — Ronnie M Mancho
(74) *Attorney, Agent, or Firm* — JCIPRNET

(57) ABSTRACT

An information processing apparatus includes a controller. The controller controls, in accordance with a touch on one or plural devices by a user, execution of a cooperative function that uses the one or plural devices.

17 Claims, 13 Drawing Sheets

FIG. 6

| DEVICE ID | NAME OF TOUCHED DEVICE | SINGLE-DEVICE FUNCTION |
|---|---|---|
| A | ROBOT | LIFT FUNCTION, MOVEMENT FUNCTION, OPERATION FUNCTION, MAINTENANCE FUNCTION, ⋯ |
| B | PC | DISPLAY FUNCTION, STORAGE FUNCTION, ⋯ |
| C | MFP | PRINT FUNCTION, SCAN FUNCTION, COPY FUNCTION, FACSIMILE FUNCTION, POST-PROCESSING FUNCTION, ⋯ |
| D | PROJECTOR | PROJECTION FUNCTION, ⋯ |
| ⋯ | ⋯ | ⋯ |

FIG. 7

| DEVICE ID | NAME OF TOUCHED DEVICE | TOUCHED PORTION | PORTION ID | SINGLE-DEVICE FUNCTION |
|---|---|---|---|---|
| A | ROBOT (A1) | ARM PORTION | Aa | LIFT FUNCTION |
| | | LEG PORTION | Ab | MOVEMENT FUNCTION |
| | | HAND PORTION | Ac | OPERATION FUNCTION |
| | | ... | ... | ... |
| B | PC (B) | DISPLAY PORTION | Ba | SCREEN DISPLAY FUNCTION |
| | | BODY PORTION | Bb | DATA STORAGE FUNCTION |
| | | ... | ... | ... |
| C | MFP (C) | BODY PORTION | Ca | PRINT FUNCTION |
| | | READ PORTION | Cb | SCAN FUNCTION |
| | | POST-PROCESSOR | Cc | STAPLING FUNCTION |
| | | ... | ... | ... |
| D | PROJECTOR (D) | BODY PORTION | Da | PROJECTION FUNCTION |
| | | ... | ... | ... |

FIG. 8

| COMBINATION OF DEVICE IDS | COMBINATION OF TOUCHED DEVICES | COOPERATIVE FUNCTION |
|---|---|---|
| A, A | ROBOT (A1), ROBOT (A2) | TRANSPORT FUNCTION, HANDSHAKE FUNCTION, MAINTENANCE FUNCTION, ··· |
| B, C | PC (B), MFP (C) | SCAN AND TRANSFER FUNCTION, PRINT FUNCTION, ··· |
| C, D | MFP (C), PROJECTOR (D) | PROJECTION FUNCTION, PRINT FUNCTION, ··· |
| ··· | ··· | ··· |

FIG. 9

| COMBINATION OF DEVICE IDS | COMBINATION OF TOUCHED PORTIONS (COMBINATION OF PORTION IDS) | COOPERATIVE FUNCTION |
|---|---|---|
| A, A | HAND PORTION (A1c) OF ROBOT (A1), HAND PORTION (A2c) OF ROBOT (A2) | HANDSHAKE FUNCTION |
| | ARM PORTION (A1a) OF ROBOT (A1), ARM PORTION (A2a) OF ROBOT (A2) | LIFT FUNCTION |
| | ... | ... |
| B, C | DISPLAY PORTION (Ba) OF PC (B), BODY PORTION (Ca) OF MFP (C) | PRINT FUNCTION |
| | ... | ... |
| C, D | BODY PORTION (Ca) OF MFP (C), BODY PORTION (Da) OF PROJECTOR (D) | PRINT FUNCTION |
| | ... | ... |
| C, D | READ PORTION (Cb) OF MFP (C), BODY PORTION (Da) OF PROJECTOR (D) | SCAN AND PROJECTION FUNCTION |
| | ... | ... |
| ... | ... | ... |

FIG. 18

| COMBINATION OF DEVICE IDS | COMBINATION OF TOUCHED DEVICES OR PORTIONS, ORDER OF TOUCH | COOPERATIVE FUNCTION |
|---|---|---|
| A, A | HAND PORTION OF ROBOT (A1) → HAND PORTION OF ROBOT (A2) | HANDSHAKE FUNCTION |
| | ARM PORTION OF ROBOT (A1) → ARM PORTION OF ROBOT (A2) | LIFT FUNCTION |
| | TRUNK PORTION OF ROBOT (A1) → TRUNK PORTION OF ROBOT (A2) | A1 MAINTAINS A2 |
| | TRUNK PORTION OF ROBOT (A2) → TRUNK PORTION OF ROBOT (A1) | A2 MAINTAINS A1 |
| | ... | ... |
| B, C | PC (B) → MFP (C) | PRINT FUNCTION |
| | MFP (C) → PC (B) | SCAN AND TRANSFER FUNCTION |
| | ... | ... |
| ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-157098 filed Aug. 16, 2017.

BACKGROUND

Technical Field

The present invention relates to an information processing apparatus and a non-transitory computer readable medium.

SUMMARY

According to an aspect of the invention, there is provided an information processing apparatus including a controller. The controller controls, in accordance with a touch on one or plural devices by a user, execution of a cooperative function that uses the one or plural devices.

BRIEF DESCRIPTION OF THE DRAWINGS

An exemplary embodiment of the present invention will be described in detail based on the following figures, wherein:

FIG. 6 is a diagram illustrating an example of a single-device function management table;

FIG. 7 is a diagram illustrating an example of a single-device function management table;

FIG. 8 is a diagram illustrating an example of a cooperative function management table;

FIG. 9 is a diagram illustrating an example of a cooperative function management table;

FIG. 18 is a diagram illustrating an example of a cooperative function management table according to modification example 1;

DETAILED DESCRIPTION

Figure 1:
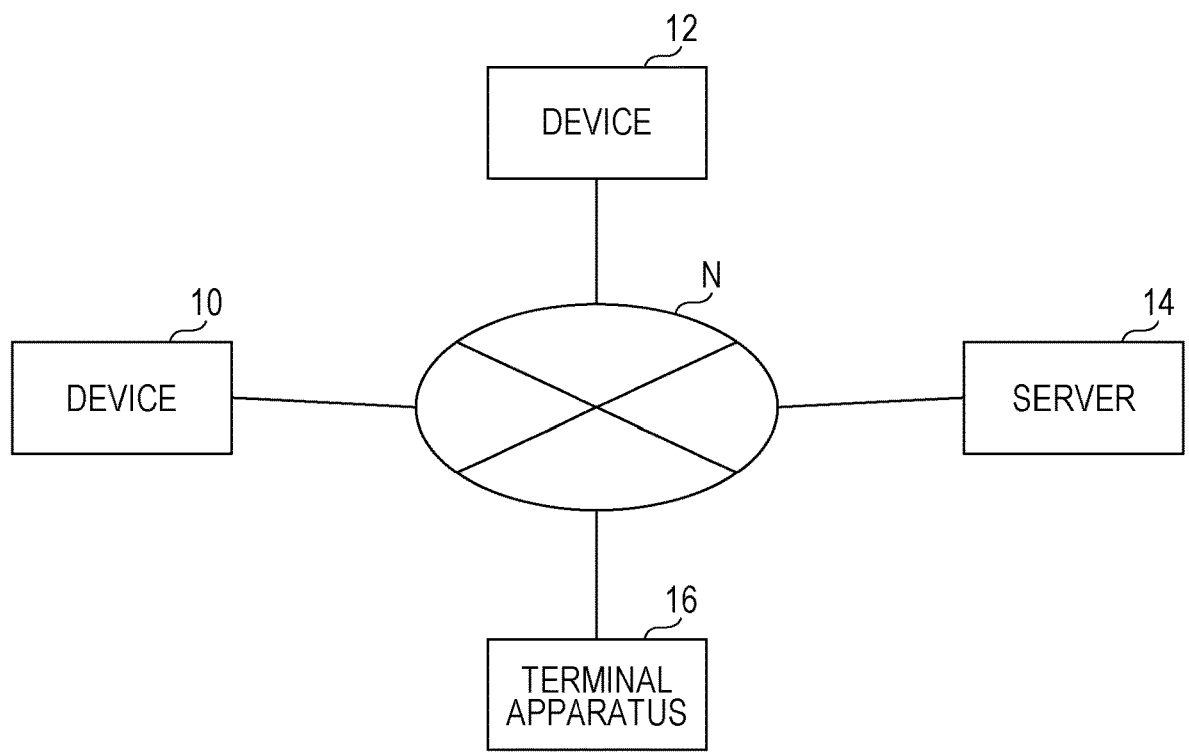
FIG. 1 is a block diagram illustrating a device system according to the exemplary embodiment of the present invention.

With reference to FIG. 1, a device system as an information processing system according to an exemplary embodiment of the present invention will be described. FIG. 1 illustrates an example of the device system according to the exemplary embodiment.

The device system according to the exemplary embodiment includes, for example, plural devices (for example, devices 10 and 12), a server 14, and a terminal apparatus 16. In the example illustrated in FIG. 1, the devices 10 and 12, the server 14, and the terminal apparatus 16 have a function of communicating with each other through a communication path N, such as a network. Of course, the devices 10 and 12, the server 14, and the terminal apparatus 16 may communicate with each other through different communication paths, without using the communication path N. In the example illustrated in FIG. 1, two devices (the devices 10 and 12) are included in the device system. Alternatively, three or more devices may be included in the device system. Alternatively, plural servers 14 and plural terminal apparatuses 16 may be included in the device system.

The devices 10 and 12 are devices having one or more functions. Any devices that execute a predetermined operation and function under a predetermined condition may be included in the scope of devices according to the exemplary embodiment. For example, an information device, a video device, an audio device, and other devices may be included in the scope of devices according to the exemplary embodiment. More specifically, a humanoid robot, an animal robot, other types of robots, an image forming apparatus having an image formation function, a display apparatus such as a television receiver, a recording apparatus, a playback apparatus, an image capturing apparatus such as a video camera, a personal computer (PC), a smartphone, a mobile phone, a refrigerator, a rice cooker, a microwave oven, a washing machine, an air conditioner, a lighting device, a clock, a monitoring camera, an automobile, a motorcycle, an aircraft (for example, an unmanned aircraft (a so-called drone)), a game machine, and so forth may be included in the scope of devices according to the exemplary embodiment.

The device 10 has, for example, a function of detecting a touch on the device 10 by a user and providing information in accordance with the detection result, a function of executing a process in accordance with the detection result and a process execution instruction, and so forth. The device 10 may execute only a function of the device 10, may execute a process by using another apparatus or a user, and may execute a process in cooperation with another apparatus or a user. The touch on the device 10 by the user is not necessarily detected by the device 10 that is touched, but may be detected by another apparatus (for example, the server 14 or the terminal apparatus 16). For example, the touch on the device 10 by the user may be photographed by a camera installed around the device 10, an image obtained through the photographing may be transmitted to another apparatus, and the other apparatus may analyze the image, so that the touch on the device 10 by the user may be detected from the image. The image may be transmitted to the device 10, and the device 10 may analyze the image, so that the touch on the device 10 by the user may be detected.

Alternatively, the device 10 may detect a portion touched by the user (a touched portion) in the device 10 and may provide information in accordance with the detection result or may execute a process in accordance with the detection result. For example, plural sensors may be provided in the device 10, and a touch on each portion of the device 10 by the user may be detected. For another example, a touch on the device 10 by the user may be photographed by a camera and an image obtained through the photographing may be analyzed, so that the portion touched by the user may be detected. A touch on the device 12 by the user is also detected similarly to the case of the device 10.

The server 14 is an apparatus that manages the functions of individual devices. For example, the server 14 manages the functions of the individual devices, cooperative functions that are executable with use of plural devices, and so forth. The server 14 may manage, for each user, one or more functions available to the user. A function available to the user is, for example, a function provided to the user without charge, a function provided to the user with charge and purchased by the user, or the like. The server 14 may manage, for each user, available function information representing one or more functions available to the user (for example, function purchase history information). Of course, the server 14 does not necessarily manage functions in accordance with whether or not the functions have been purchased, because there are functions free of charge, additional update functions, and special functions managed by a manager. A function purchase process is performed by, for example, the server 14. Of course, the function purchase process may be performed by another device (for example, the device 10 or 12).

The terminal apparatus 16 is, for example, an apparatus such as a personal computer (PC), a tablet PC, a smartphone, or a mobile phone.

In the exemplary embodiment, if a user touches a device, a process is executed in accordance with the touch. For example, a function of the device touched by the user may be executed, a function that uses the touched portion (for example, a function assigned to the touched portion) may be executed, or information representing a function of the device or a function assigned to the touched portion may be displayed on the terminal apparatus 16 or the like. If the user touches plural devices, a cooperative function that uses the plural devices may be executed, a cooperative function that uses plural portions touched by the user (for example, a cooperative function that uses the functions assigned to the plural portions) may be executed, or information representing the cooperative function may be displayed on the terminal apparatus 16 or the like. If the user touches plural portions of the same device, a cooperative function that uses the plural portions may be executed, or information representing the cooperative function may be displayed.

Hereinafter, a detailed description will be given of the individual devices included in the device system.

Figure 2:
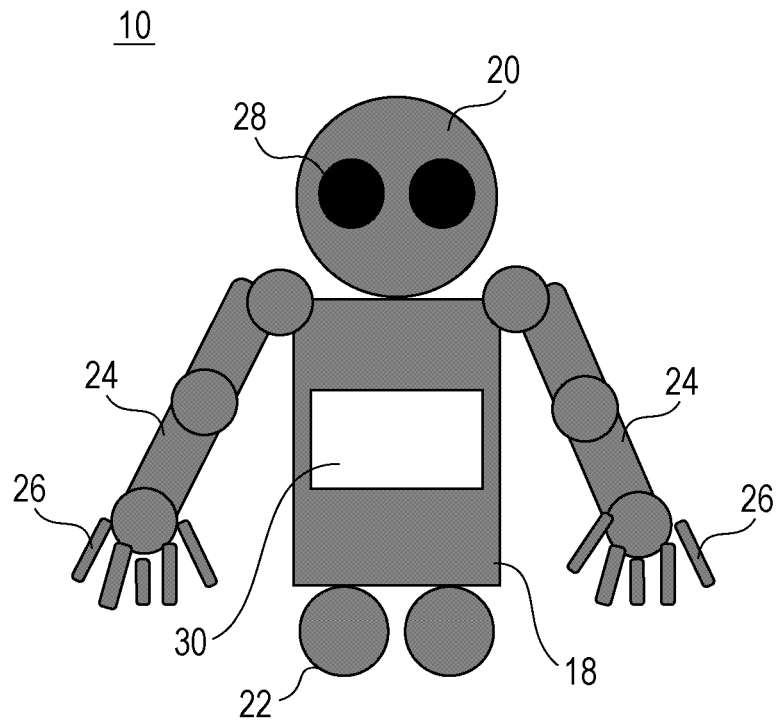
FIG. 2 is a diagram illustrating the external appearance of a robot.

FIG. 2 illustrates the external appearance of a robot, which is an example of the device 10. In the example illustrated in FIG. 2, the device 10 is illustrated as a humanoid robot, but the device 10 may be an animal robot or another device. Hereinafter, the device 10 may be referred to as a robot 10.

In the example illustrated in FIG. 2, the robot 10 includes a trunk portion 18, a head portion 20 on the trunk portion 18, leg portions 22 under the trunk portion 18, arm portions 24 on both sides of the trunk portion 18, and hand portions 26 at the ends of the respective arm portions 24.

The robot 10 may include, for example, at least one of a visual sensor, an auditory sensor, a tactile sensor, a taste sensor, and an olfactory sensor, and may have an ability related to at least one of a sense of sight, a sense of hearing, a sense of touch, a sense of taste, and a sense of smell corresponding to the five senses of the human. Regarding the sense of touch, the robot 10 may have, for example, an ability of separately recognizing a superficial sensation (a sense of touch, a sense of pain, a sense of temperature, etc.), a deep sensation (a sense of pressure, a sense of position, a sense of vibration, etc.), and a cortical sensation (a sense of two-point discrimination, a stereognostic sense, etc.). In addition, the robot 10 may have a sense of equilibrium. For example, a sensor such as a camera 28 is provided in the head portion 20, and the sense of sight is achieved by image recognition using an image obtained by the camera 28 or the like. In addition, the robot 10 includes a sound collector such as a microphone, and the sense of hearing is achieved by sound recognition using a sound obtained by the microphone.

The robot 10 may have a function of detecting brain waves of a human (for example, a function of receiving brain wave information from a brain wave detection device that is attached to a human and analyzing brain waves).

The leg portions 22 correspond to an example of a movement unit and are driven by, for example, a driving force supplied from a driving source, such as a motor. The robot 10 is capable of moving by using the leg portions 22. The leg portions 22 may have a shape of human legs, may be rollers or tires, or may have another shape. The leg portions 22 are merely an example of a movement unit. The robot 10 may have, as a movement unit other than the leg portions 22, for example, a configuration for flying (for example, a propeller, wings, an engine for flying, or the like) or a configuration for moving underwater (for example, an engine for moving underwater or the like). That is, the robot 10 may include, as a movement unit, at least one of a unit for moving on land, a unit for flying, and a unit for moving underwater. Of course, the robot 10 does not necessarily include the movement unit.

The robot 10 may have an ability of grasping or operating an object by using the arm portions 24 and the hand portions 26. The robot 10 may have an ability of moving while grasping or holding an object.

The robot 10 may have a function of generating a sound. The robot 10 may have a communication function and may transmit data to and receive data from another apparatus. For example, the robot 10 may receive or transmit information by connecting to the Internet or the like, and may perform searching by using the Internet or the like. The robot 10 may have an ability of communicating with a human, another apparatus, or another robot by, for example, generating a sound or transmitting a communication message.

The robot 10 may have a humanlike ability of making a determination through, for example, machine learning using artificial intelligence (AI). Also, deep learning using neural networks may be used, or reinforcement learning for partially reinforcing a learning area may be used. Also, a genetic algorithm, cluster analysis, a self-organizing map, ensemble learning, or the like may be used. Of course, another technology related to AI may be used.

The robot 10 may communicate with another device by using the communication function and control the operation of the other device. The robot 10 may operate the other device by using a remote control or the like or may directly operate the other device without using a remote control or the like. In the case of the direct operation, the robot 10 may operate an operation unit (for example, a button, a panel, or the like) provided in the other device. If it is impossible to control the operation of the other device through communication, the robot 10 may operate the other device by using a remote control or the like or may directly operate the other device. The robot 10 may analyze an image obtained by the visual sensor, thereby identifying the operation unit of the other device or the remote control and operating the other device or the remote control.

In addition, the robot 10 may include a user interface (UI) unit 30. The UI unit 30 includes a display and an operation unit. The display is, for example, a display apparatus such as a liquid crystal display. The operation unit is, for example, an input apparatus such as a touch screen or a keyboard. The UI unit 30 may be a user interface functioning as both a display and an operation unit (including, for example, a touch display or an apparatus that electronically displays a keyboard or the like on a display). On the display of the UI unit 30, various images, messages, or the like are displayed. In addition, the robot 10 may include a projector and may project various images, messages, or the like onto another object. For example, an image or the like is projected and displayed on a table or a wall.

Figure 3:
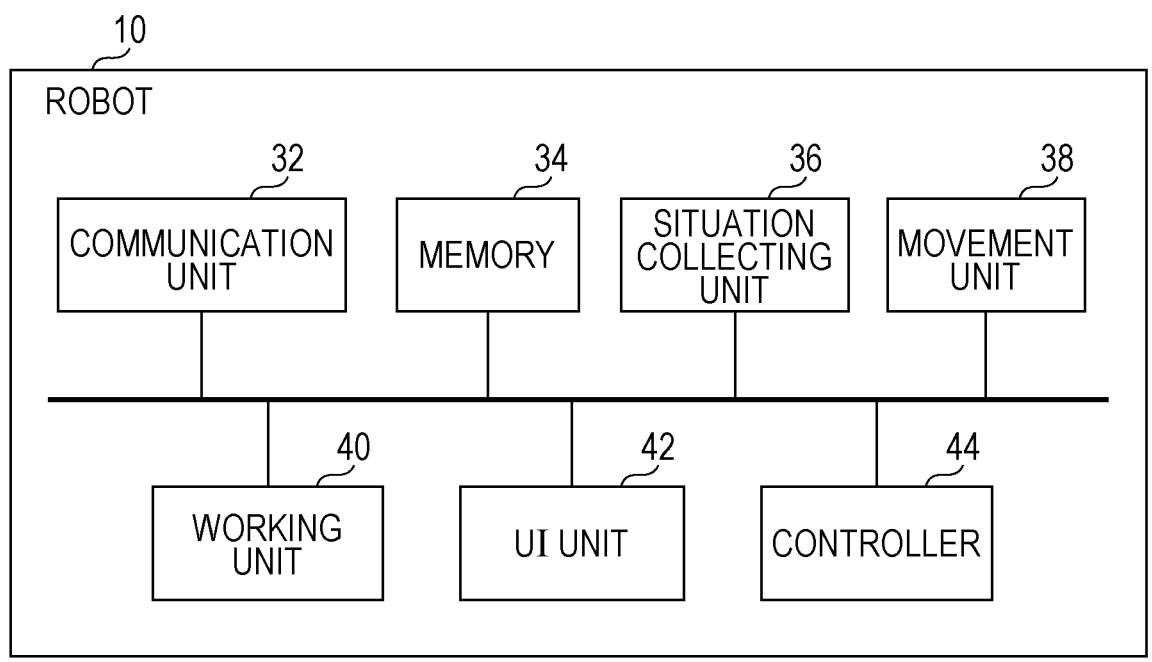
FIG. 3 is a block diagram illustrating the configuration of the robot.

Hereinafter, a detailed description will be given of the configuration of the robot 10 with reference to FIG. 3. FIG. 3 is a block diagram illustrating the configuration of the robot 10.

A communication unit 32 is a communication interface and has a function of transmitting data to another apparatus and a function of receiving data from another apparatus. The communication unit 32 may be a communication interface having a wireless communication function or a communication interface having a wired communication function. The communication unit 32 may be compatible with, for example, one or plural communication schemes, and may communicate with a communication partner by using a communication scheme suitable for the communication partner (i.e., a communication scheme with which the communication partner is compatible). The communication scheme is, for example, infrared communication, visible light communication, Wi-Fi (registered trademark) communication, near field radio communication (for example, Bluetooth (registered trademark)), Radio Frequency Identifier (RFID), or the like. The communication unit 32 may, for example, switch the communication scheme in accordance with a communication partner, or switch the communication scheme in accordance with the surroundings (for example, the distance between the robot 10 and the communication partner or the presence/absence of an obstacle between the robot 10 and the communication partner). As a frequency band for communication, for example, a short-wavelength band ranging from 800 MHz to 920 MHz (Low Power Wide Area (LPWA)) or the like), a long wavelength of 2.4 GHz or 5 GHz (MulteFire), or the like may be used. The communication unit 32 may, for example, switch the frequency band in accordance with a communication partner, or switch the frequency band in accordance with the surroundings.

A memory 34 is a storage apparatus such as a hard disk or a memory (for example, a solid state drive (SSD) or the like). The memory 34 stores, for example, various pieces of data, various programs, and the like. In addition, the memory 34 may store information representing the address of another device (address information), information representing the address of the server 14 (address information), information representing the address of the terminal apparatus 16 (address information), and so forth. These pieces of information may be stored in different storage apparatuses or in the same storage apparatus.

A situation collecting unit 36 has a function of collecting, by using various sensors, information about a touch on the robot 10 and information about a situation around the robot 10. The above-described visual sensor, auditory sensor, tactile sensor, taste sensor, olfactory sensor, and the like are used as the various sensors.

The situation collecting unit 36 detects, for example, a touch on the robot 10 by a user by using the tactile sensor. As the tactile sensor, a pressure sensitive sensor, a capacitive sensor, or the like is used. For example, tactile sensors are provided in the individual portions of the robot 10 (for example, the trunk portion 18, the head portion 20, the leg portions 22, the arm portions 24, the hand portions 26, and so forth), and the situation collecting unit 36 detects, by using the tactile sensors provided in the individual portions, a portion of the robot 10 touched by the user. In addition, the situation collecting unit 36 may detect, by using the visual sensor (for example, a camera) of the robot 10, a portion of the robot 10 touched by the user. For another example, a camera installed around the robot 10 may photograph the robot 10, and an image obtained through the photographing may be analyzed by the server 14 or the robot 10, so that the portion touched by the user may be specified.

In addition, the situation collecting unit 36 may collect, by using the auditory sensor, data of sounds around the robot 10 (for example, conversational voice of humans, noises, and the like), that is, sound data, and may collect, by using the visual sensor, data of an image (for example, a moving image or a still image) around the robot 10. Information about a situation around the robot 10 may be collected by using a sensor other than these sensors.

Alternatively, a touch on the robot 10 by the user may be detected or sound data and image data representing a situation around the robot 10 may be collected by using an apparatus other than the robot 10, a sensor, or the like.

The above-described robot 10 is merely an example of a device. Also in a device other than the robot 10, tactile sensors are provided in individual portions of the device, and a portion touched by the user is detected by one of the tactile sensors provided in the individual portions of the device. The detection is performed by, for example, the situation collecting unit 36 provided in the device. That is, also in an image forming apparatus, a PC, or the like serving as a device other than the robot 10, a portion touched by the user is detected. In addition, as described above, a portion touched by the user may be detected by analyzing an image obtained through photographing.

A movement unit 38 has a function of moving the robot 10 by using at least one of a unit for moving on land, a unit for flying, and a unit for moving underwater. In the example illustrated in FIG. 2, the movement unit 38 is constituted by the leg portions 22. Of course, the robot 10 does not necessarily include the movement unit 38.

A working unit 40 has a function of operating a device other than the robot 10, lifting an object, and moving an object. In the example illustrated in FIG. 2, the working unit 40 is constituted by the arm portions 24 and the hand portions 26. Of course, the robot 10 does not necessarily include the working unit 40.

A UI unit 42 corresponds to the UI unit 30 illustrated in FIG. 2.

A controller 44 has a function of controlling the operations of the individual units of the robot 10. The controller 44 includes, for example, AI as an intelligence unit, and the functions of the individual units of the robot 10 may be controlled by the AI.

Figure 4:
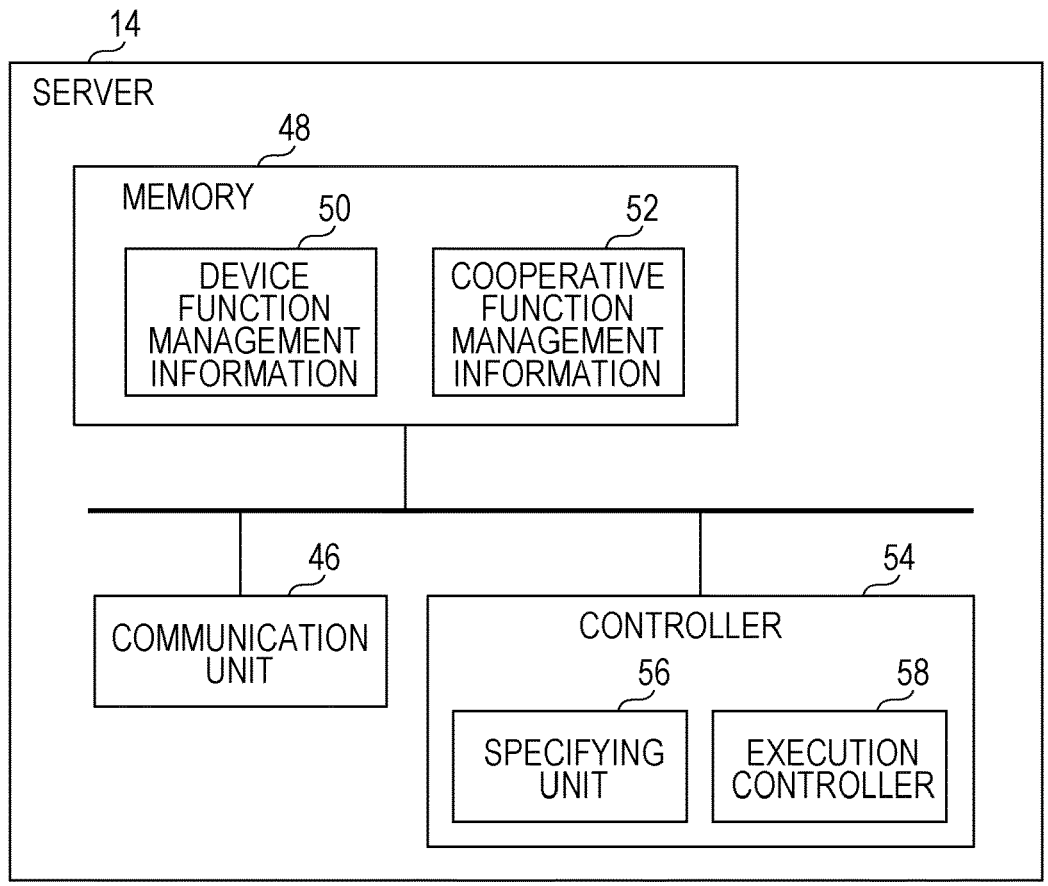
FIG. 4 is a block diagram illustrating the configuration of a server.

Hereinafter, a detailed description will be given of the configuration of the server 14 with reference to FIG. 4. FIG. 4 is a block diagram illustrating the configuration of the server 14.

A communication unit 46 is a communication interface and has a function of transmitting data to another apparatus and a function of receiving data from another apparatus. The communication unit 46 may be a communication interface having a wireless communication function or may be a communication interface having a wired communication function.

A memory 48 is a storage apparatus such as a hard disk or a memory (for example, an SSD or the like). The memory 48 stores, for example, device function management information 50, cooperative function management information 52, various pieces of data, various programs, information representing the addresses of individual devices, information representing the address of the server 14, information representing the address of the terminal apparatus 16, and so forth. Of course, these pieces of information or data may be stored in different storage apparatuses or in one storage apparatus. The device function management information 50 and the cooperative function management information 52 stored in the memory 48 may be provided to the devices 10 and 12 and the terminal apparatus 16 periodically or at designated timing, and accordingly the information stored in the devices 10 and 12 and the terminal apparatus 16 may be updated. Hereinafter, a description will be given of the device function management information 50 and the cooperative function management information 52.

The device function management information 50 is information for managing the functions of individual devices and is, for example, information representing the correspondence between device identification information for identifying a device touched by a user and one or more pieces of function information representing one or more functions of the device. The device identification information includes, for example, a device ID, a device name, information representing the type of the device, a model number of the device, information for managing the device (for example, an asset management number or the like), information representing the position of the device (device position information), a device image related to the device, address information of the device, and so forth. The device image is, for example, an external appearance image of the device. The external appearance image may be an image showing the outer side of the device (for example, the housing of the device), an image showing a state in which the housing is open and the inside of the device is seen from the outside (for example, an internal structure), or an image showing a state in which the device is covered by a packing sheet or the like. The device image may be an image generated by photographing the device (an image showing the outer side of the device or an image showing the inner side of the device) or may be an image representing the device (for example, an icon or the like). The function information includes, for example, a function ID, a function name, and so forth. The functions of the individual devices are specified (identified) by referring to the device function management information 50.

The devices managed by the device function management information 50 are, for example, the devices included in the device system (for example, the devices 10 and 12). Of course, a device not included in the device system may be managed by the device function management information 50. For example, the server 14 may obtain information (information including device identification information and function information) about a new device not included in the device system and may newly register the information in the device function management information 50. Information about the device may be obtained by using the Internet or the like or may be input by a manager or the like. The server 14 may update the device function management information 50 at certain timing, periodically, or at timing designated by a manager or the like. Accordingly, function information representing a function that a device does not have before update and that the device has after update may be registered in the device function management information 50. Also, function information representing a function that a device has before update and that the device does not have after update may be deleted from the device function management information 50 or may be registered as unavailable information. Information for update may be obtained by using the Internet or the like or may be input by a manager or the like.

The cooperative function management information 52 is information for managing cooperative functions, each being executed through cooperation between plural functions. One or plural cooperative functions are executed through cooperation between plural functions. Each cooperative function may be executed through cooperation between plural functions of one device or may be executed through cooperation between plural functions of plural devices.

A cooperative function may be a function that is executed without using a hardware device. For example, a cooperative function may be a function that is executed through cooperation between plural software units. Of course, a cooperative function may be a function that is executed through cooperation between a function of a hardware device and a function implemented by software.

The cooperative function management information 52 is, for example, information representing the correspondence between a combination of pieces of function information representing individual functions that are used in a cooperative function, and cooperative function information representing the cooperative function. The cooperative function information includes, for example, a cooperative function ID, a cooperative function name, and so forth. If a single function is updated, the cooperative function management information 52 is also updated in accordance with the update. Accordingly, a cooperative function that uses plural functions that are incapable of cooperating with each other before update may become available after update. On the other hand, a cooperative function that is available before update may become unavailable after update. Cooperative function information representing a cooperative function that becomes available after update is registered in the cooperative function management information 52, and cooperative function information representing a cooperative function that becomes unavailable after update is deleted from the cooperative function management information 52 or is registered as unavailable information.

In a case where plural devices cooperate with each other, the cooperative function management information 52 is information for managing a cooperative function that uses plural functions of the plural devices touched by a user, and is information representing the correspondence between a combination of pieces of device identification information for identifying the individual devices that are used in the cooperative function, and cooperative function information. If the device function management information 50 is updated, the cooperative function management information 52 is also updated in accordance with the update. Accordingly, a cooperative function that uses plural devices that are incapable of cooperating with each other before update may become available. On the other hand, a cooperative function that is available before update may become unavailable after update.

A cooperative function may be a function that is executed through cooperation between plural functions different from each other or may be a function that is executed through cooperation between functions identical to each other. A cooperative function may be a function that is not available without cooperation. The function that is not available without cooperation may be a function that becomes available by using functions identical to each other or a function that becomes available by combining functions different from each other among the functions of target devices that cooperate with each other. For example, the cooperation between a device having a print function (printer) and a device having a scan function (scanner) implements a copy function as a cooperative function. That is, the cooperation between the print function and the scan function implements the copy function. In this case, the copy function as a cooperative function is associated with the combination of the print function and the scan function. In the cooperative function management information 52, for example, the cooperative function information representing the copy function as a cooperative function is associated with the combination of the device identification information for identifying the device having the print function and the device identification information for identifying the device having the scan function.

The scope of the concept of a cooperative function may include a combination function in which a new function is executable through cooperation between plural functions or plural devices. For example, an expanded display function as a combination function may be implemented by combining plural displays. For another example, a recording function as a combination function may be implemented by combining a television receiver and a recorder. The recording function may be a function of recording an image displayed on the television receiver. Also, a shooting range expansion function as a combination function may be implemented by combining plural cameras. The expansion function is a function of, for example, taking a picture by combining the shooting ranges of the plural cameras. Also, a phone call translation function (a function of translating phone conversation) as a combination function may be implemented by combining a phone and a translation machine or translation software. In this way, the scope of the concept of a cooperative function includes a function that is executable through cooperation between devices or functions of the same type and a function that is executable through cooperation between devices or functions of different types.

The memory 48 may store available function management information. The available function management information is information for managing one or more functions available to each user, and is, for example, information representing the correspondence between user identification information for identifying a user and one or more pieces of function information (may include cooperative function information) representing one or more functions available to the user. A function available to the user is, as described above, for example, a function provided to the user without charge or a function purchased by the user, and may be a single-device function or a cooperative function. The user identification information is, for example, user account information such as a user ID and a user name. Functions available to the individual users are specified (identified) by referring to the available function management information. The available function management information is updated every time a function is provided to a user (for example, every time a function is provided to a user with or without charge).

A controller 54 controls the operations of the individual units of the server 14. The controller 54 includes a specifying unit 56 and an execution controller 58.

The specifying unit 56 has a function of receiving device identification information for identifying a device touched by a user or portion identification information for identifying a portion of the device touched by the user, and specifying one or more functions associated with the device identification information or one or more functions associated with the portion identification information in the device function management information 50 stored in the memory 48. Accordingly, the one or more functions of the device or the one or more functions assigned to the portion of the device are specified. For example, the device identification information or the portion identification information is transmitted from the device touched by the user to the server 14, and the specifying unit 56 specifies one or more functions by using the received information. The information about the one or more functions specified by the specifying unit 56 may be transmitted from the server 14 to the device touched by the user or the terminal apparatus 16 and may be displayed on the device or the terminal apparatus 16. In addition, the one or more functions may be executed.

If the user touches plural devices, the specifying unit 56 receives pieces of device identification information for identifying the individual devices or pieces of portion identification information for identifying portions touched by the user, and specifies one or more cooperative functions associated with the combination of the pieces of device identification information or one or more cooperative functions associated with the combination of the pieces of portion identification information in the cooperative function management information 52 stored in the memory 48. Accordingly, the one or more cooperative functions that are executed through cooperation between functions of the target devices are specified (identified). For example, the pieces of device identification information or the pieces of portion identification information are transmitted from the devices touched by the user to the server 14, and the specifying unit 56 specifies one or more cooperative functions by using the pieces of information received from the devices. The information about the one or more functions specified by the specifying unit 56 may be transmitted from the server 14 to the devices touched by the user or the terminal apparatus 16 and may be displayed on the devices or the terminal apparatus 16. In addition, the one or more cooperative functions may be executed.

For example, if the user touches one device, the specifying unit 56 may receive device identification information for identifying the device and may specify one or more functions associated with the device identification information in the device function management information 50. Accordingly, if the user touches one device, one or more functions of the device are specified (identified). If the user touches plural devices, the specifying unit 56 may receive pieces of device identification information for identifying the plural devices and may specify one or more cooperative functions associated with the combination of the pieces of device identification information in the cooperative function management information 52. Accordingly, if the user touches plural devices, one or more cooperative functions that use the functions of the plural devices are specified (identified).

If functions available to the user are managed, the specifying unit 56 may receive user identification information for identifying the user and may specify individual functions associated with the user identification information in the available function management information stored in the memory 48. For example, user identification information is transmitted from the terminal apparatus 16 to the server 14, and the individual functions associated with the user identification information are specified by the specifying unit 56. The information about the individual functions available to the user (for example, information representing the names of the individual functions) may be transmitted from the server 14 to the terminal apparatus 16 and may be displayed on the terminal apparatus 16, for example. Accordingly, the information about the individual functions available to the user specified by the user identification information is displayed on the terminal apparatus 16. For example, the specifying unit 56 receives device identification information and user identification information, specifies one or more functions associated with the device identification information in the device function management information 50, and also specifies one or more functions associated with the user identification information in the available function management information. Accordingly, the one or more functions that the device specified by the device identification information has and that are available to the user specified by the user identification information are specified.

The execution controller 58 has a function of causing a device touched by a user to execute a function specified by the specifying unit 56. If the user touches plural devices and a cooperative function is specified, the execution controller 58 causes the plural devices to execute the cooperative function.

The controller 54 may execute a function purchase process and may manage the history of the purchase. For example, if a pay function is purchased by a user, the controller 54 may apply a charging process to the user.

Figure 5:
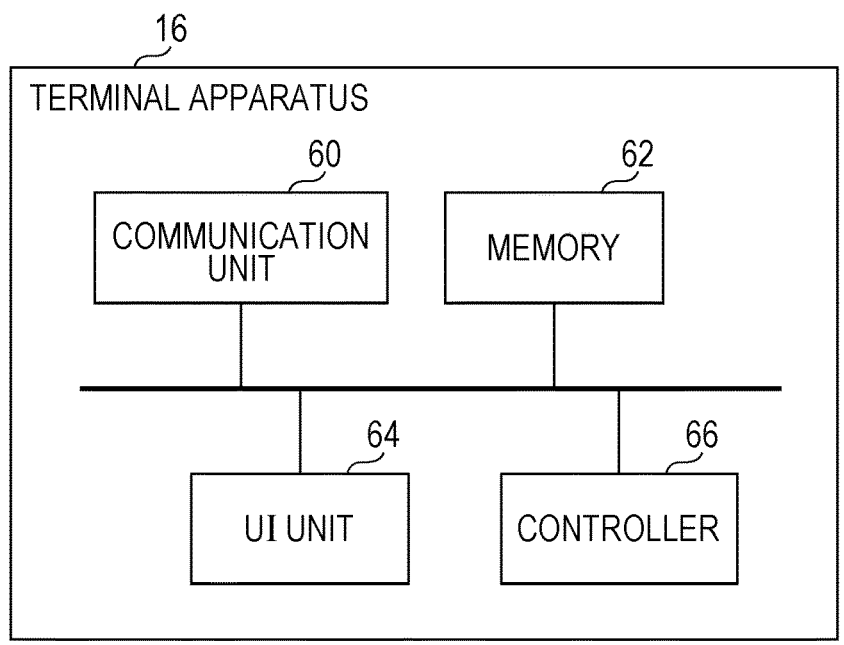
FIG. 5 is a block diagram illustrating the configuration of a terminal apparatus.

Hereinafter, a detailed description will be given of the configuration of the terminal apparatus 16 with reference to FIG. 5. FIG. 5 is a block diagram illustrating the configuration of the terminal apparatus 16.

A communication unit 60 is a communication interface and has a function of transmitting data to another apparatus and a function of receiving data from another apparatus. The communication unit 60 may be a communication interface having a wireless communication function or a communication interface having a wired communication function. The communication unit 60 may be compatible with, for example, one or plural communication schemes, and may communicate with a communication partner by using a communication scheme suitable for the communication partner (i.e., a communication scheme with which the communication partner is compatible). The communication scheme is, for example, infrared communication, visible light communication, Wi-Fi communication, near field radio communication, or the like. The communication unit 60 may, for example, switch the communication scheme or the frequency band in accordance with a communication partner, or switch the communication scheme or the frequency band in accordance with the surroundings.

A memory 62 is a storage apparatus such as a hard disk or a memory (for example, an SSD or the like), and stores various programs, various pieces of data, information representing the address of the server 14, information representing the addresses of individual devices (for example, address information of the devices 10 and 12), information about an identified device, information about identified target devices that cooperate with each other, information about one or more functions of an identified device, information about a cooperative function, and so forth.

A UI unit 64 is a user interface unit and includes a display and an operation unit. The display is, for example, a display apparatus such as a liquid crystal display. The operation unit is, for example, an input apparatus such as a touch screen, a keyboard, or a mouse. Of course, the UI unit 64 may be a user interface functioning as both a display and an operation unit (including, for example, a touch display or an apparatus that electronically displays a keyboard or the like on a display).

A controller 66 controls the operations of the individual units of the terminal apparatus 16. The controller 66 causes the UI unit 64 to display, for example, information received by the terminal apparatus 16 from the devices 10 and 12, the server 14, and so forth.

The above-described device function management information 50 may be stored in the memory 62 of the terminal apparatus 16. In this case, the device function management information 50 is not necessarily stored in the memory 48 of the server 14. Also, the above-described cooperative function management information 52 may be stored in the memory 62 of the terminal apparatus 16. In this case, the cooperative function management information 52 is not necessarily stored in the memory 48 of the server 14. The controller 66 of the terminal apparatus 16 may include the above-described specifying unit 56 and execution controller 58, may specify one or more functions of a device or a cooperative function, and may control the execution of a function by the device. In this case, the server 14 does not necessarily include the specifying unit 56 and the execution controller 58.

If available function management information is created, the available function management information may be stored in the memory 62 of the terminal apparatus 16. In this case, the available function management information is not necessarily stored in the memory 48 of the server 14. The controller 66 of the terminal apparatus 16 may manage a function purchase history of a user. In this case, the controller 54 of the server 14 does not necessarily have the management function therefor. The controller 66 of the terminal apparatus 16 may specify one or more functions available to a user on the basis of user identification information.

The device function management information 50 and the cooperative function management information 52 may be stored in a device such as the device 10 or 12, and a device such as the device 10 or 12 may include the specifying unit 56 and the execution controller 58. That is, the processes by the specifying unit 56 and the execution controller 58 of the server 14 may be performed in the server 14, may be performed in the terminal apparatus 16, or may be performed in a device such as the device 10 or 12.

Hereinafter, a more detailed description will be given of the device system according to the exemplary embodiment.

With reference to FIG. 6, a detailed description will be given of the device function management information 50. FIG. 6 illustrates a single-device function management table, which is an example of the device function management information 50. This single-device function management table is information for managing the functions of devices as single-device functions. In this single-device function management table, for example, a device ID of a device, information representing the name of the device, and information representing one or more functions (single-device functions) of the device are associated with each other. The device ID and the device name correspond to an example of device identification information. For example, the device having a device ID "A" is the robot 10 and has functions such as a lift function (a function of lifting an object), a movement function, an operation function, and a maintenance function.

For example, if a user touches a device, the touch is detected by the device, and device identification information (for example, a device ID) related to the device is transmitted from the device to the server 14. The specifying unit 56 specifies one or more functions associated with the device identification information in the single-device function management table. Accordingly, the one or more functions of the device touched by the user are specified. The information representing the one or more specified functions may be transmitted from the server 14 to the terminal apparatus 16 and may be displayed on the UI unit 64 of the terminal apparatus 16. Alternatively, the information may be transmitted from the server 14 to the device touched by the user and may be displayed on the device. If the user provides an execution instruction to execute a function in the terminal apparatus 16 or the device in which the information representing the function is displayed, the device touched by the user executes the function. Alternatively, a specified function may be executed under control of the execution controller 58.

FIG. 7 illustrates another single-device function management table. This single-device function management table is information for managing the functions of devices as single-device functions. In this single-device function management table, for example, a device ID of a device, information representing the name of the device, information representing portions of the device (for example, the names of the portions), IDs of the portions, and information representing functions assigned to the individual portions (for example, functions that are executable with use of the individual portions) are associated with each other. The portion ID corresponds to an example of portion identification information. For example, the device having a device ID "A" is the robot 10 (robot A1), and a function assigned to arm portions (a function that is executable with use of the arm portions) is a lift function.

For example, if a user touches a device, a portion touched by the user is detected by the device, and device identification information (for example, a device ID) related to the device and portion identification information (for example, a portion ID) related to the portion touched by the user are transmitted from the device to the server 14. The specifying unit 56 specifies one or more functions associated with the device identification information and the portion identification information in the single-device function management table. Accordingly, the one or more functions that are executable with use of the portion touched by the user are specified. The information representing the one or more specified functions may be transmitted from the server 14 to the terminal apparatus 16 and may be displayed on the UI unit 64 of the terminal apparatus 16. Alternatively, the information may be transmitted from the server 14 to the device touched by the user and may be displayed on the device. If the user provides an execution instruction to execute a function in the terminal apparatus 16 or the device in which the information representing the function is displayed, the device touched by the user executes the function. Alternatively, a specified function may be executed under control of the execution controller 58.

Hereinafter, a detailed description will be given of the cooperative function management information 52 with reference to FIG. 8. FIG. 8 illustrates a cooperative function management table, which is an example of the cooperative function management information 52. This cooperative function management table is information for managing functions that are executable with use of plural devices as cooperative functions. In this cooperative function management table, for example, a combination of device IDs, information representing the names of plural target devices that cooperate with each other, and information representing one or more cooperative functions that are executable with use of the plural devices are associated with each other. For example, the device having a device ID "B" is a PC, and the device having a device ID "C" is a multifunction peripheral (MFP). The cooperation between the PC B and the MFP C enables the execution of, for example, a scan and transfer function and a print function as cooperative functions. The scan and transfer function is a function of transferring image data generated through scanning by the MFP C to the PC B. The print function is a function of transmitting data (for example, image date or document data) stored in the PC B to the MFP C and printing the data by the MFP C.

For example, if a user touches plural devices, the individual touches are detected by the individual devices, and pieces of device identification information (for example, device IDs) related to the individual devices are transmitted from the individual devices to the server 14. The specifying unit 56 specifies a cooperative function associated with the combination of the plural pieces of device identification information in the cooperative function management table. Accordingly, the cooperative function that is executable with use of the plural devices touched by the user is specified. The information representing the specified cooperative function may be transmitted from the server 14 to the terminal apparatus 16 and may be displayed on the UI unit 64 of the terminal apparatus 16, or the information may be transmitted from the server 14 to the individual devices touched by the user and may be displayed on the individual devices. If the user provides an execution instruction to execute the cooperative function in the terminal apparatus 16 or the devices in which the information representing the cooperative function is displayed, the plural devices touched by the user execute the cooperative function. Alternatively, the specified cooperative function may be executed under control of the execution controller 58. If plural cooperative functions are specified, a predetermined cooperative function among the plural cooperative functions may be executed, or an inquiry may be made to ask the user which is a target cooperative function to be executed.

For example, if the user touches the PC B and the MFP C, the touches are detected by the individual devices, and the device ID of the PC B and the device ID of the MFP C are transmitted from the respective devices to the server 14.

In the server 14, the specifying unit 56 specifies cooperative functions (the scan and transfer function, the print function, and so forth) associated with the combination of the PC B and the MFP C in the cooperative function management table. The information representing the cooperative functions is transmitted from the server 14 to the terminal apparatus 16, the PC B, or the MFP C and is displayed thereon. In this case, if the user selects a cooperative function in the terminal apparatus 16 or the like and provides an execution instruction, the PC B and the MFP C execute the cooperative function selected by the user. For example, if the scan and transfer function is selected as a cooperative function by the user, the PC B and the MFP C execute the scan and transfer function.

FIG. 9 illustrates another cooperative function management table. This cooperative function management table is information for managing functions that are executable with use of plural devices as cooperative functions. In this cooperative function management table, for example, a combination of device IDs, information representing a combination of portions of plural devices that cooperate with each other (names or portion IDs), and information representing one or more cooperative functions that are executable with use of the plural portions are associated with each other. For example, the cooperation between a hand portion A1c of the robot A1 and a hand portion A2c of a robot A2 enables the execution of a handshake function (a function in which the robots shake hands) as a cooperative function. The cooperation between a display portion Ba of the PC B and a body portion Ca of the MFP C enables the execution of a print function as a cooperative function, for example. The print function is a function of transmitting data stored in the PC B to the MFP C and printing the data by the MFP C.

For example, if a user touches plural devices, the portions touched by the user are detected by the individual devices, and pieces of device identification information (for example, device IDs) related to the individual devices and pieces of portion identification information (for example, portion IDs) related to the portions touched by the user are transmitted from the individual devices to the server 14. The specifying unit 56 specifies a cooperative function associated with the plural pieces of device identification information and the plural pieces of portion identification information in the cooperative function management table. Accordingly, the cooperative function that is executable with use of the plural portions touched by the user is specified. The information representing the specified cooperative function may be transmitted from the server 14 to the terminal apparatus 16 and may be displayed on the UI unit 64 of the terminal apparatus 16, or the information may be transmitted from the server 14 to the individual devices touched by the user and may be displayed on the individual devices. If the user provides an execution instruction to execute the cooperative function in the terminal apparatus 16 or the device in which the information representing the cooperative function is displayed, the plural devices touched by the user execute the cooperative function. The specified cooperative function may be executed under control of the execution controller 58. If plural cooperative functions are specified, a predetermined cooperative function among the plural cooperative functions may be executed, or an inquiry may be made to ask the user which is a target cooperative function to be executed.

For example, if the user touches the display portion Ba of the PC B and the body portion Ca of the MFP C, the touches are detected by the individual devices, and the device ID of the PC B, the portion ID of the display portion Ba, the device ID of the MFP C, and the portion ID of the body portion Ca are transmitted from the respective devices to the server 14. In the server 14, the specifying unit 56 specifies a print function as a cooperative function associated with the combination of the display portion Ba of the PC B and the body portion Ca of the MFP C in the cooperative function management table. The information representing the print function as a cooperative function may be transmitted from the server 14 to the terminal apparatus 16, the PC B, or the MFP C and may be displayed thereon. In this case, if an execution instruction to execute the print function as a cooperative function is provided by the user in the terminal apparatus 16 or the like, the PC B and the MFP C execute the print function as a cooperative function. If the print function as a cooperative function is specified, the PC B and the MFP C may execute the print function as a cooperative function under control of the execution controller 58.

Hereinafter, a description will be given of a process of executing a cooperative function. First, a user touches plural devices (for example, the PC B and the MFP C). Accordingly, the specifying unit 56 of the server 14 identifies the plural devices and specifies a cooperative function that is executable with use of the plural devices. Subsequently, the server 14 transmits information representing an execution instruction to the plural devices touched by the user. The execution instruction information includes information representing the cooperative function specified by the specifying unit 56 and information about the individual devices touched by the user (including, for example, pieces of device identification information and pieces of address information of the devices). In response to receipt of the execution instruction information, the PC B and the MFP C execute the function in accordance with the execution instruction information. For example, the PC B transmits information representing a connection request to the MFP C by using the device identification information and the address information of the MFP C, which are included in the execution instruction information. The MFP C transmits information representing a connection request to the PC B by using the device identification information and the address information of the PC B, which are included in the execution instruction information. Accordingly, communication is established between the PC B and the MFP C. Subsequently, the PC B and the MFP C execute the cooperative function in accordance with the execution instruction while transmitting information to and receiving information from each other in a state where the communication is established.

Hereinafter, a description will be given of the operation of the device system according to the exemplary embodiment by using specific examples.

Specific Example 1

Figure 10:
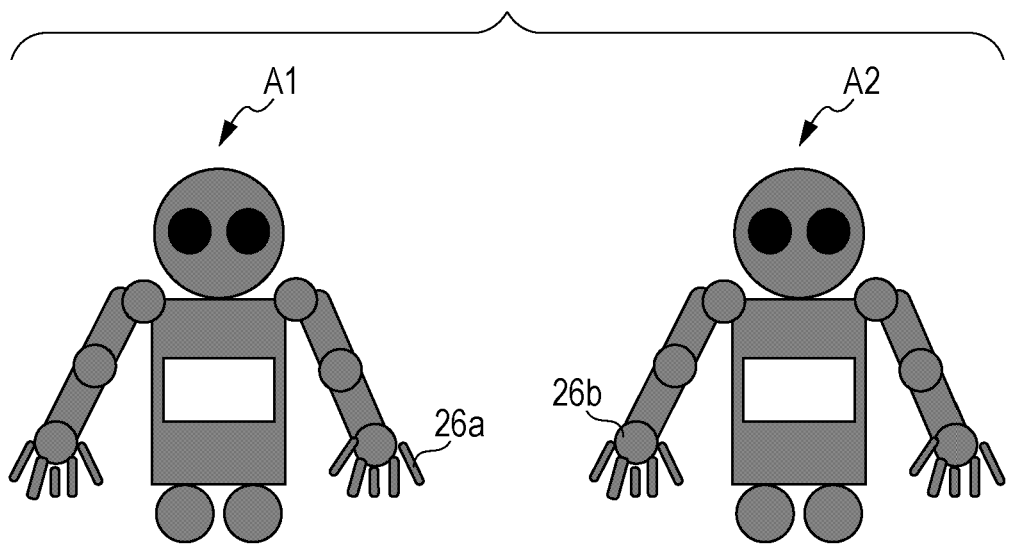
FIG. 10 is a diagram for describing an operation according to specific example 1.
Figure 11:
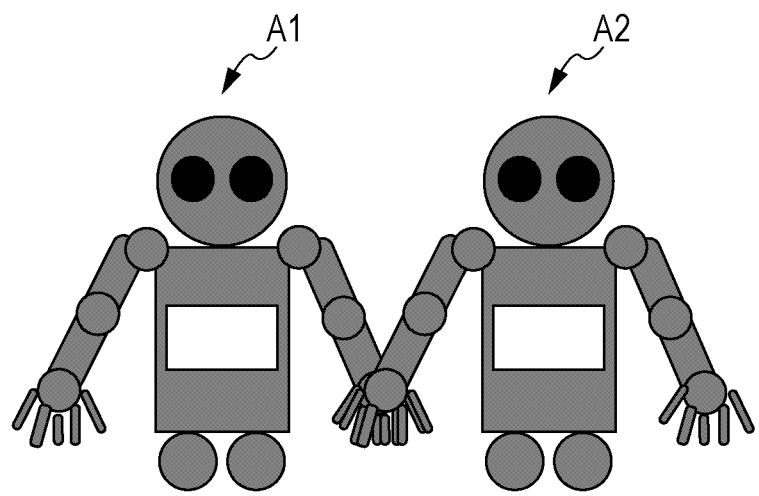
FIG. 11 is a diagram for describing the operation according to specific example 1.

FIGS. 10 and 11 illustrate specific example 1. For example, it is assumed that the robots A1 and A2 are used as devices. In specific example 1, it is assumed that devices touched by a user are detected and also portions touched by the user in the devices are detected.

As illustrated in FIG. 10, it is assumed that the user touches a hand portion (left hand) 26a of the robot A1 and a hand portion (right hand) 26b of the robot A2. In this case, the touches by the user are detected in the respective devices, and pieces of information representing the detection results are transmitted to the server 14. Specifically, the device ID of the robot A1 and the portion ID of the hand portion 26a of the robot A1 are transmitted from the robot A1 to the server 14, and the device ID of the robot A2 and the portion ID of the hand portions 26b of the robot A2 are transmitted from the robot A2 to the server 14.

In the server 14, the specifying unit 56 specifies a handshake function as a cooperative function associated with the combination of the hand portions of the robots A1 and A2 in the cooperative function management table illustrated in FIG. 9, for example.

The execution controller 58 of the server 14 transmits information representing an execution instruction to execute the handshake function as a cooperative function to the robots A1 and A2. The execution instruction information includes information representing the handshake function as a cooperative function, the pieces of device identification information of the robots A1 and A2, and the pieces of address information of the robots A1 and A2. The pieces of address information of the individual devices (for example, the robots A1 and A2) may be managed by the server 14 in advance, or the individual devices touched by the user may transmit the pieces of address information assigned thereto to the server 14.

In response to receipt of the execution instruction information, the robots A1 and A2 execute the handshake function as a cooperative function. At this time, each of the robots A1 and A2 detects the partner device and establishes communication with the partner device by using the address information and the device identification information of the partner device included in the execution instruction information. The robots A1 and A2 execute the cooperative function while transmitting information to and receiving information from each other. Since the hand portion (left hand) 26a of the robot A1 and the hand portion (right hand) 26b of the robot A2 are touched by the user, the handshake function as a cooperative function is specifically a function in which the robot A1 shakes with the left hand, whereas the robot A2 shakes with the right hand. The execution instruction information includes information representing the details of the function to be executed. The robots A1 and A2 execute the details of the function. Accordingly, the robots A1 and A2 shake hands by using the left hand (the robot A1) and the right hand (the robot A2) as illustrated in FIG. 11.

In specific example 1, the information representing the handshake function as a cooperative function specified by the specifying unit 56 may be transmitted from the server 14 to the terminal apparatus 16 and may be displayed on the UI unit 42 of the terminal apparatus 16. At this time, information about the individual devices touched by the user (the robots A1 and A2), that is, the pieces of address information and the pieces of device identification information of the robots A1 and A2, are transmitted from the server 14 to the terminal apparatus 16, together with the information representing the cooperative function. The terminal apparatus 16 as a destination of the information representing the cooperative function may be registered in the server 14 in advance. Alternatively, when the user touches the devices, the information for identifying the terminal apparatus 16 carried by the user may be transmitted from the terminal apparatus 16 to the server 14 in accordance with an instruction provided by the user.

If the user provides an instruction to execute the cooperative function by using the terminal apparatus 16, the terminal apparatus 16 transmits the execution instruction information for the cooperative function to the robots A1 and A2 by using the pieces of address information of the robots A1 and A2. The execution instruction information includes the information representing the cooperative function to be executed, the pieces of address information of the robots A1 and A2, and the pieces of device identification information of the robots A1 and A2. The robots A1 and A2 establish communication with each other and execute the handshake function as a cooperative function while transmitting information to and receiving information from each other, as described above. In this way, the cooperative function may be executed in accordance with an execution instruction provided by the user.

Specific Example 2

Figure 12:
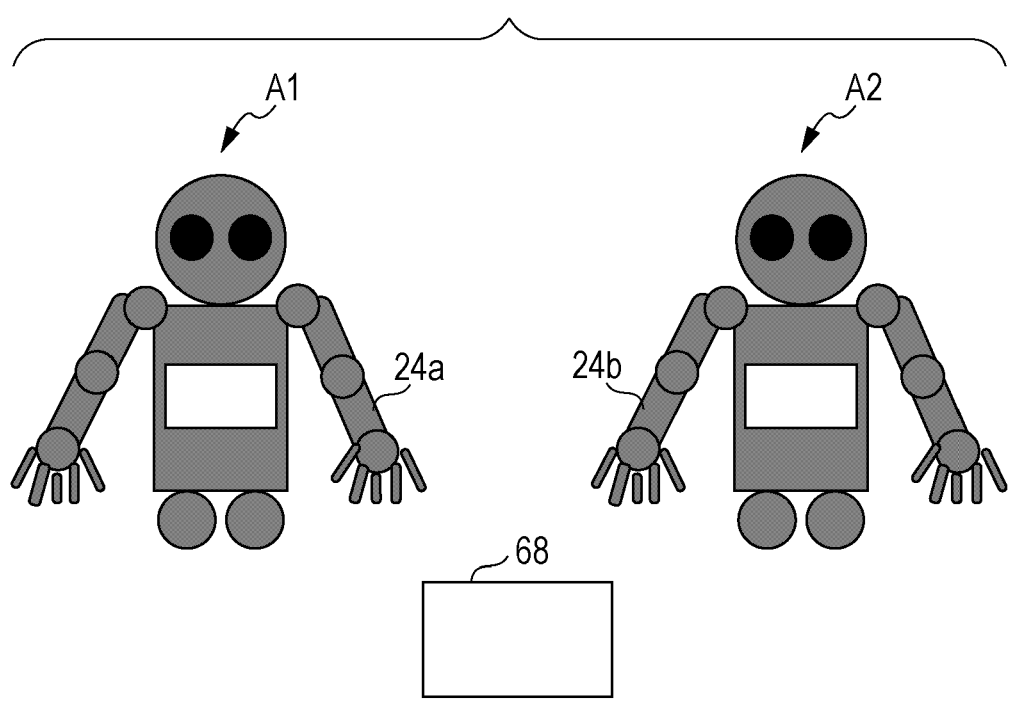
FIG. 12 is a diagram for describing an operation according to specific example 2.
Figure 13:
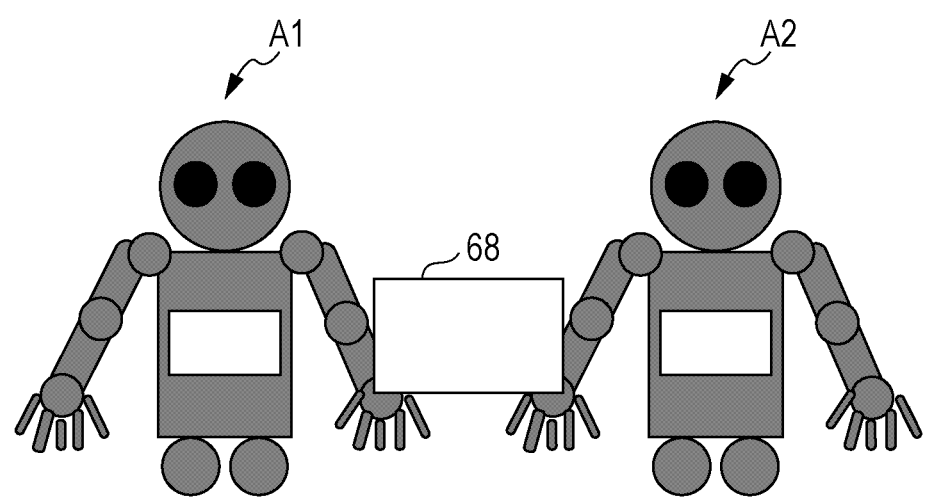
FIG. 13 is a diagram for describing the operation according to specific example 2.

FIGS. 12 and 13 illustrate specific example 2. For example, it is assumed that the robots A1 and A2 are used as devices. In specific example 2, it is assumed that devices touched by a user are detected, and also portions touched by the user in the devices are detected.

As illustrated in FIG. 12, it is assumed that the user touches an arm portion 24a of the robot A1 and an arm portion 24b of the robot A2. In this case, the touches by the user are detected in the individual devices, and pieces of information representing the detection results are transmitted to the server 14. Specifically, the device ID of the robot A1 and the portion ID of the arm portion 24a of the robot A1 are transmitted from the robot A1 to the server 14, and the device ID of the robot A2 and the portion ID of the arm portion 24b of the robot A2 are transmitted from the robot A2 to the server 14.

In the server 14, the specifying unit 56 specifies a lift function as a cooperative function associated with the combination of the arm portions of the robots A1 and A2 in the cooperative function management table illustrated in FIG. 9, for example.

The execution controller 58 of the server 14 transmits information representing an execution instruction to execute the lift function as a cooperative function to the robots A1 and A2. The execution instruction information includes information representing the lift function as a cooperative function, the pieces of device identification information of the robots A1 and A2, and the pieces of address information of the robots A1 and A2.

In response to receipt of the execution instruction information, the robots A1 and A2 execute the lift function as a cooperative function. At this time, each of the robots A1 and A2 detects the partner device and establishes communication with the partner device by using the address information and the device identification information of the partner device included in the execution instruction information. The robots A1 and A2 execute the cooperative function while transmitting information to and receiving information from each other. When the user touches an object 68, the robots A1 and A2 detect the touch by using the visual sensor or the like and recognize the object 68 as a target to be lifted. Subsequently, the robots A1 and A2 cooperate with each other to lift the object 68, as illustrated in FIG. 13.

In specific example 2, the information representing the lift function as a cooperative function specified by the specifying unit 56 may be transmitted from the server 14 to the terminal apparatus 16 and may be displayed on the UI unit 42 of the terminal apparatus 16. At this time, the information about the individual devices touched by the user (the robots A1 and A2), that is, the pieces of address information and the pieces of device identification information of the robots A1 and A2, are transmitted from the server 14 to the terminal apparatus 16, together with the information representing the cooperative function.

If the user provides an instruction to execute the cooperative function by using the terminal apparatus 16, the terminal apparatus 16 transmits the execution instruction information for the cooperative function to the robots A1 and A2 by using the pieces of address information of the robots A1 and A2. The execution instruction information includes the information representing the cooperative function to be executed, the pieces of address information of the robots A1 and A2, and the pieces of device identification information of the robots A1 and A2. The robots A1 and A2 establish communication with each other and execute the lift function as a cooperative function while transmitting information to and receiving information from each other, as described above. If the user touches the object 68, the robots A1 and A2 lift the object 68.

Specific Example 3

Figure 14:
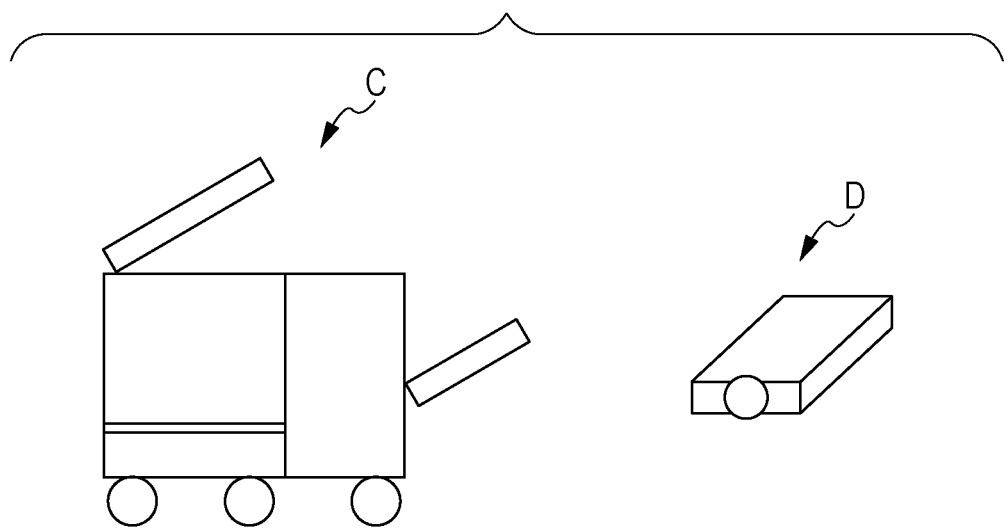
FIG. 14 is a diagram for describing an operation according to specific example 3.
Figure 15:
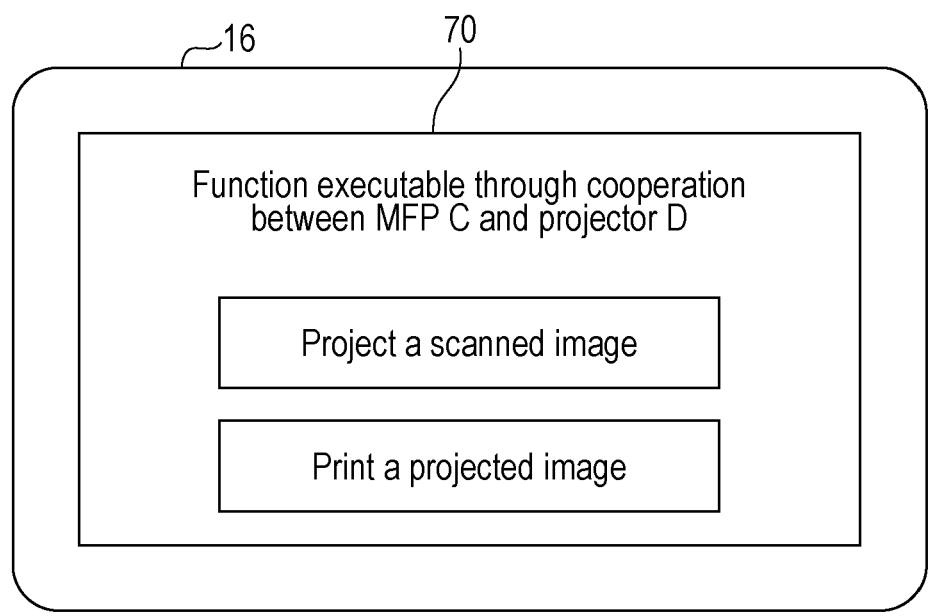
FIG. 15 is a diagram illustrating a screen according to specific example 3.

FIGS. 14 and 15 illustrate specific example 3. For example, it is assumed that the MFP C and a projector D are used as devices. In specific example 3, it is assumed that devices touched by a user are detected but portions touched by the user in the devices are not detected.

As illustrated in FIG. 14, it is assumed that the user touches the MFP C and the projector D. In this case, the touches by the user are detected in the individual devices, and pieces of information representing the detection results are transmitted to the server 14. Specifically, the device ID of the MFP C is transmitted from the MFP C to the server 14, and the device ID of the projector D is transmitted from the projector D to the server 14.

In the server 14, the specifying unit 56 specifies cooperative functions (the scan and transfer function, the print function, and so forth) associated with the combination of the MFP C and the projector D in the cooperative function management table illustrated in FIG. 8, for example.

The information representing the cooperative functions specified by the specifying unit 56 is transmitted from the server 14 to the terminal apparatus 16 and is displayed on the UI unit 42 of the terminal apparatus 16. At this time, the information about the devices touched by the user (the MFP C and the projector D), that is, the pieces of address information and the pieces of device identification information of the MFP C and the projector D, are transmitted from the server 14 to the terminal apparatus 16, together with the information representing the cooperative functions.

For example, as illustrated in FIG. 15, a screen 70 is displayed on the UI unit 42 of the terminal apparatus 16. On the screen 70, the information representing the cooperative functions specified by the specifying unit 56, that is, the information representing the cooperative functions that are executable with use of the MFP C and the projector D, is displayed. For example, it is assumed that the cooperative functions that are executable with use of the MFP C and the projector D are the scan and transfer function and the print function. In this case, information representing the scan and transfer function (a character string "project a scanned image") and information representing the print function (a character string "print a projected image") are displayed on the screen 70.

If the user selects a cooperative function from among the scan and transfer function and the print function and provides an execution instruction on the screen 70, the terminal apparatus 16 transmits execution instruction information for the cooperative function selected by the user to the MFP C and the projector D by using the pieces of address information of the MFP C and the projector D. The execution instruction information includes information representing the cooperative function that has been selected by the user and that is to be executed, the pieces of address information of the MFP C and the projector D, and the pieces of device identification information of the MFP C and the projector D. The MFP C and the projector D establish communication with each other and execute the cooperative function selected by the user while transmitting information to and receiving information from each other, as described above.

Specific Example 4

Figure 16:
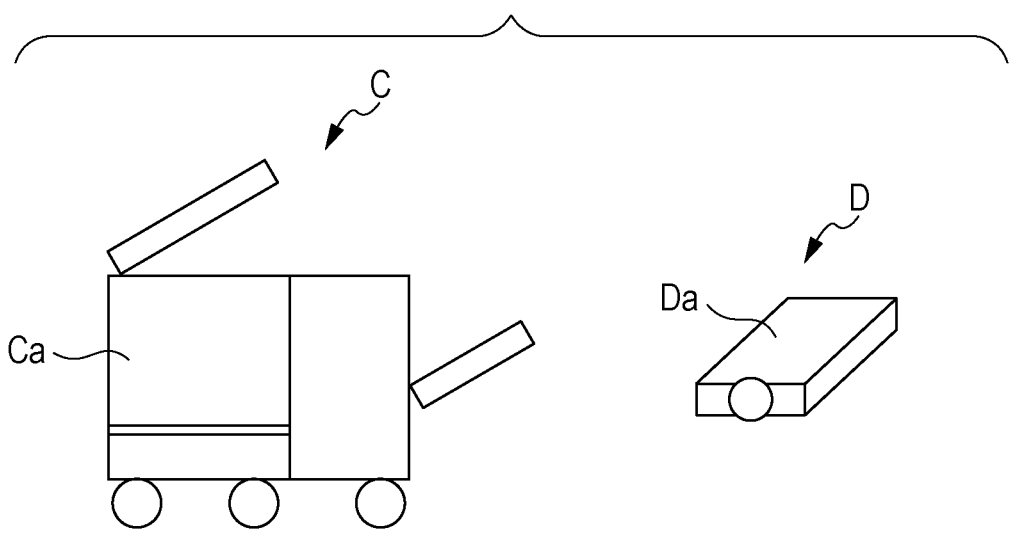
FIG. 16 is a diagram for describing an operation according to specific example 4.
Figure 17:
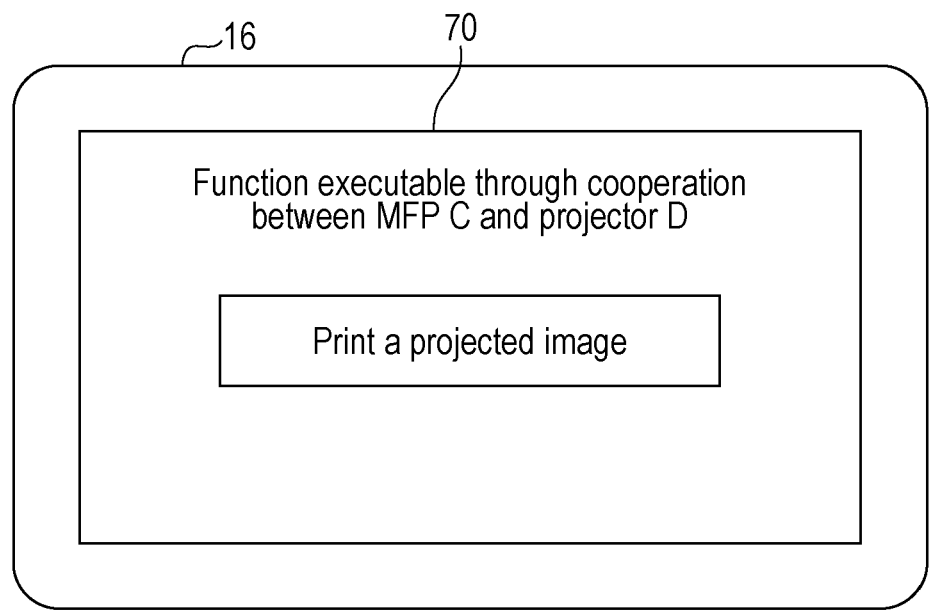
FIG. 17 is a diagram illustrating a screen according to specific example 4.

FIGS. 16 and 17 illustrate specific example 4. For example, it is assumed that the MFP C and the projector D are used as devices. In specific example 4, it is assumed that devices touched by a user are detected, and also portions touched by the user in the devices are detected.

As illustrated in FIG. 16, it is assumed that the user touches the body portion Ca of the MFP C and a body portion Da of the projector D. In this case, the touches by the user are detected in the individual devices, and pieces of information representing the detection results are transmitted to the server 14. Specifically, the device ID of the MFP C and the portion ID of the body portion Ca of the MFP C are transmitted from the MFP C to the server 14, and the device ID of the projector D and the portion ID of the body portion Da of the projector D are transmitted from the projector D to the server 14.

In the server 14, the specifying unit 56 specifies the print function as a cooperative function associated with the combination of the body portion Ca of the MFP C and the body portion Da of the projector D in the cooperative function management table illustrated in FIG. 9, for example.

The execution controller 58 of the server 14 transmits information representing an execution instruction to execute the print function as a cooperative function to the MFP C and the projector D. The execution instruction information includes information representing the print function as a cooperative function, the pieces of device identification information of the MFP C and the projector D, and the pieces of address information of the MFP C and the projector D.

In response to receipt of the execution instruction information, the MFP C and the projector D execute the print function as a cooperative function. At this time, each of the MFP C and the projector D detects the partner device and establishes communication with the partner device by using the address information and the device identification information of the partner device included in the execution instruction information. Subsequently, the MFP C and the projector D execute the cooperative function while transmitting information to and receiving information from each other.

In specific example 4, the information representing the print function as a cooperative function specified by the specifying unit 56 may be transmitted from the server 14 to the terminal apparatus 16 and may be displayed on the UI unit 42 of the terminal apparatus 16. At this time, the information about the devices touched by the user (the MFP C and the projector D), that is, the pieces of address information and the pieces of device identification information of the MFP C and the projector D, are transmitted from the server 14 to the terminal apparatus 16, together with the information representing the cooperative function.

For example, as illustrated in FIG. 17, the screen 70 is displayed on the UI unit 42 of the terminal apparatus 16. On the screen 70, the information representing the cooperative function specified by the specifying unit 56, that is, the information representing the cooperative function that is executable with use of the body portion Ca of the MFP C and the body portion Da of the projector D, is displayed. For example, it is assumed that the cooperative function is the print function. In this case, information representing the print function (a character string "print a projected image") is displayed on the screen 70.

If the user provides an execution instruction to execute the print function on the screen 70, the terminal apparatus 16 transmits execution instruction information for the cooperative function to the MFP C and the projector D by using the pieces of address information of the MFP C and the projector D. The execution instruction information includes information representing the cooperative function to be executed, the pieces of address information of the MFP C and the projector D, and the pieces of device identification information of the MFP C and the projector D. The MFP C and the projector D establish communication with each other and execute the print function as a cooperative function while transmitting information to and receiving information from each other, as described above.

In specific examples 1 to 4 described above, the user touches two devices, but the user may touch three or more devices. Also in this case, a cooperative function that is executable with use of the three or more devices is specified, the cooperative function is executed, and information representing the cooperative function is displayed. If the user touches plural portions of the same device, a cooperative function that is executable with use of the plural portions is specified. As described above, a cooperative function may be a function that is executable with use of plural devices or a function that is executable with use of plural portions included in the same device. According to the exemplary embodiment, every time the user touches a device, the touch is detected, and a cooperative function is specified in accordance with the touches. For example, if the user touches different devices or different portions one after another, a cooperative function is sequentially changed, and information in which the change is reflected is displayed on the terminal apparatus 16, for example.

As described above, according to the exemplary embodiment, if a user touches plural devices, a cooperative function that uses the plural devices is executed. If portions touched by the user are detected in a device or devices, a cooperative function that uses the portions is executed. Accordingly, the cooperative function is provided to the user. Of course, if information representing a cooperative function is displayed on the terminal apparatus 16 or a device and if the user provides an execution instruction to execute the cooperative function, the cooperative function may be executed. Also in this case, information representing a cooperative function that is executable with use of devices is provided to the user.

If a cooperative function that is executable with use of devices touched by the user is not registered in the cooperative function management table, the specifying unit 56 of the server 14 determines that the cooperative function that is executable with use of the devices touched by the user is not registered. In this case, the controller 54 of the server 14 creates a message indicating that it is impossible to execute the cooperative function with use of the devices touched by the user and transmits the message to the terminal apparatus 16 carried by the user or the devices touched by the user. The message is displayed on the terminal apparatus 16 or the devices touched by the user. Also in this case, it may be possible to execute the cooperative function depending on the operation statuses of the devices, the environment in which the devices are installed (surroundings), change in functions of the devices (update or the like), and so forth. For example, if the user touches an MFP and a dryer and if a cooperative function that is executable with use of the MFP and the dryer is not registered in the cooperative function management table at the time of the touch, a cooperative function that is executable with use of the MFP and the dryer may be registered in the cooperative function management table thereafter. For example, if condensation occurs in the environment where the MFP is installed, it is possible to remove or prevent the condensation by using the dryer, and thus such a cooperative function may be registered in the cooperative function management table. In this case, the cooperative function that is executable with use of the MFP and the dryer becomes available. Thus, if the user touches the MFP and the dryer, the cooperative function may be executed, or the information representing the cooperative function may be displayed on the terminal apparatus 16 or the MFP.

The controller 54 of the server 14 may monitor the operation statuses of individual devices, the environments in which the devices are installed (surroundings), the update statuses of the functions of the devices, and so forth, and may determine the availability or unavailability of cooperative functions on the basis of the monitoring result. In the case of the combination of an MFP and a dryer, for example, the controller 54 determines that a cooperative function is available if the surroundings of the MFP satisfy a specific condition (for example, if condensation occurs around the MFP), and specifies a cooperative function that uses the MFP and the dryer. The same applies to the operation statuses of the devices, that is, if the operation statuses of the devices touched by the user satisfy a specific condition, the controller 54 determines that a cooperative function that uses the devices is available. Also, the same applies to a case where a function of a device is updated and a cooperative function becomes available with use of the updated function.

Modification Example 1

Hereinafter, modification example 1 will be described. In modification example 1, display of information about one or more cooperative functions is switched in accordance with an order in which plural devices are touched. For another example, a cooperative function to be executed may be changed in accordance with the order. Hereinafter, a process according to modification example 1 will be described with reference to FIGS. 18 to 20.

FIG. 18 illustrates a cooperative function management table, which is another example of the cooperative function management information 52. In this cooperative function management table, for example, a combination of device IDs, information representing a combination of plural devices or plural portions that cooperate with each other (names, device IDs, and portion IDs), information representing an order of touch (in FIG. 18, the order is represented by an arrow), and information representing a cooperative function are associated with each other. The order of touch is an order in which a user touches devices or portions.

For example, as cooperative functions that are executable with use of the PC B and the MFP C, a print function and a scan and transfer function are registered in the cooperative function management table. If the user touches the PC B and the MFP C in this order, the print function corresponds to the highest-priority cooperative function, whereas the scan and transfer function corresponds to the second-highest-priority cooperative function. On the other hand, if the user touches the MFP C and the PC B in this order, the scan and transfer function corresponds to the highest-priority cooperative function, whereas the print function corresponds to the second-highest-priority cooperative function.

For example, if the user touches the PC B and the MFP C in this order, the specifying unit 56 of the server 14 specifies the print function associated with the order of touch in the cooperative function management table illustrated in FIG. 18 as the highest-priority cooperative function, and specifies the scan and transfer function as the second-highest-priority cooperative function.

After the cooperative functions are specified by the specifying unit 56, information representing the cooperative functions specified by the specifying unit 56, information representing the order of priority of each cooperative function, and information about the devices touched by the user (the PC B and the MFP C), that is, the pieces of address information and the pieces of device identification information of the PC B and the MFP C, are transmitted from the server 14 to the terminal apparatus 16.

Figure 19:
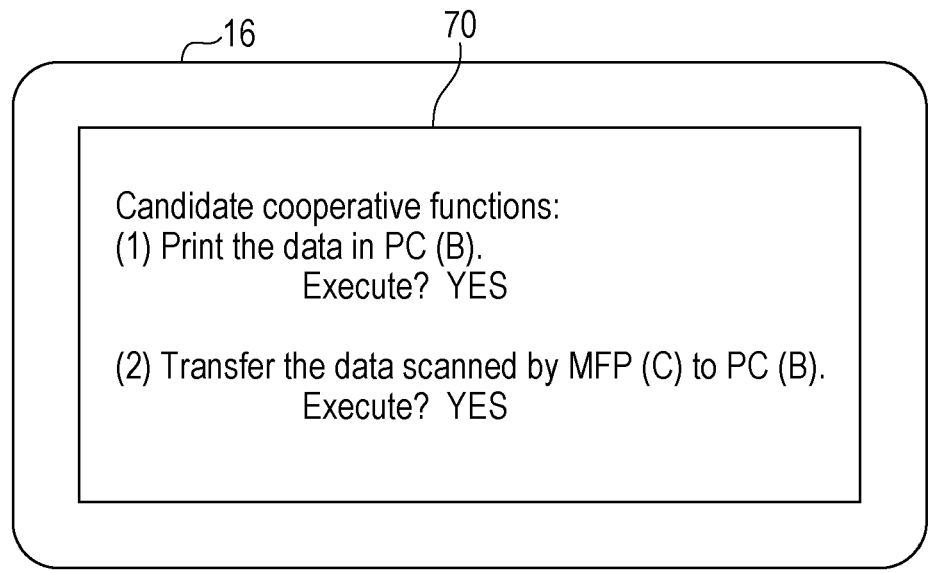
FIG. 19 is a diagram illustrating a screen.

The information about the cooperative functions is displayed on the UI unit 64 of the terminal apparatus 16. FIG. 19 illustrates a display example thereof. For example, the screen 70 is displayed on the UI unit 64 of the terminal apparatus 16, and the information about the cooperative functions is displayed on the screen 70. At this time, the information about the cooperative functions is displayed in accordance with the above-described order of priority. In the above-described example, the print function corresponds to the highest-priority cooperative function, and the scan and transfer function corresponds to the second-highest-priority cooperative function. Thus, the information about the print function is displayed with priority over (for example, above) the information about the scan and transfer function. For example, a character string "print the data in PC B" is displayed as the information about the print function, and a character string "transfer the data scanned by MFP C to PC B" is displayed as the information about the scan and transfer function.

If a cooperative function to be executed is designated by the user and if an execution instruction is provided, the designated cooperative function is executed. For example, if a "YES" button is pressed by the user, the cooperative function corresponding to the "YES" button is executed.

Figure 20:
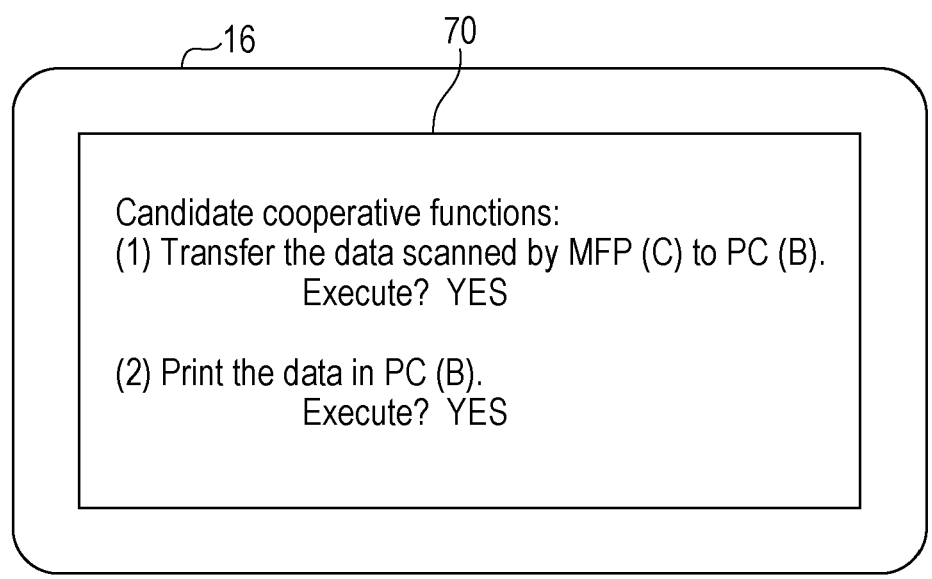
FIG. 20 is a diagram illustrating a screen.

For another example, if the user touches the MFP C and the PC B in this order, the specifying unit 56 specifies the scan and transfer function associated with the order of touch in the cooperative function management table as the highest-priority cooperative function, and specifies the print function as the second-highest-priority cooperative function. Also in this case, the information about the specified cooperative functions is displayed on the UI unit 64 of the terminal apparatus 16. FIG. 20 illustrates a display example thereof. The scan and transfer function corresponds to the highest-priority cooperative function, and the print function corresponds to the second-highest-priority cooperative function. Thus, the information about the scan and transfer function is displayed with priority over (for example, above) the information about the print function.

In the above-described examples, the information about individual cooperative functions is displayed on the terminal apparatus 16 in accordance with the order of priority. Alternatively, the highest-priority cooperative function may be executed. In this case, after the highest-priority cooperative function is specified by the specifying unit 56, the cooperative function is executed by the plural devices touched by the user under control of the execution controller 58. Of course, an inquiry about whether or not to execute the cooperative function may be made to the user before the execution.

The process of specifying a cooperative function and the process of specifying the order of priority may be performed by the devices 10 and 12 or the terminal apparatus 16.

According to modification example 1, the display order of information about cooperative functions is changed or a cooperative function to be executed is changed in accordance with an order in which devices are touched. The order in which devices are touched is also regarded as an order in which functions are used in the individual devices or an order in which data is moved between the devices that cooperate with each other, and the operation of touching the devices is regarded as the operation of designating an order of functions or an order in which data is moved. Thus, as a result of changing cooperative functions in accordance with the order of touch, information representing a cooperative function that is expected to be used by the user is preferentially displayed, or the cooperative function is executed.

In the above-described examples, cooperative functions are changed in accordance with an order in which plural devices are touched. Alternatively, cooperative functions may be changed in accordance with an order in which plural portions are touched. In the example illustrated in FIG. 18, if the user touches the trunk portion of the robot A1 and then touches the trunk portion of the robot A2, a cooperative function in which the robot A1 maintains the robot A2 is specified. On the other hand, if the user touches the trunk portion of the robot A2 and then touches the trunk portion of the robot A1, a cooperative function in which the robot A2 maintains the robot A1 is specified. Regarding an operation related to maintenance, if the user touches a robot and then touches a device to be maintained, the robot may execute the maintenance of the device.

Modification Example 2

A cooperative function to be executed or a cooperative function to be displayed may be changed for each user. For example, cooperative function management tables for individual users are created in advance and stored in the server 14. Each cooperative function management table is associated with information for identifying the user who uses the cooperative function management table (user identification information). For example, by using a cooperative function management table that varies according to a user, a cooperative function may be changed for each user. Alternatively, plural users may use the same cooperative function management table. The user identification information is, for example, a user name, a user ID, biological information (for example, a face image, fingerprint information, retina information, iris information, or voice information), or the like.

For example, if a user touches the device 10, the user is photographed by the device 10 or another camera, and an image obtained through the photographing is analyzed, so that the user who has touched the device 10 is identified. For example, the user is identified by a face authentication process. The user identification process may be performed by the server 14, may be performed by the device 10 touched by the user, or may be performed by another device. Of course, the user may be identified by biometric authentication other than face authentication (for example, fingerprint authentication, retina authentication, iris authentication, voice authentication, or the like), or the user may be identified by reading user identification information from an ID card assigned to the user (for example, an employee ID card or the like).

If the user who has touched the device is identified in the above-described manner, the specifying unit 56 of the server 14 refers to the cooperative function management table related to the identified user, thereby specifying one or more cooperative functions that use the device touched by the user. The process performed thereafter is the same as in the above-described exemplary embodiment.

As a result of changing a cooperative function for each user as described above, a cooperative function suitable for each user may be provided. For example, if the right to use a cooperative function is defined for each user, a cooperative function management table may be defined for the right, so that a cooperative function may be provided in accordance with the right. For example, in a case where different users perform the same touch operation, the cooperative function that is displayed or executed varies according to each user.

If plural users touch the same devices or the same portions, the individual users may be identified and cooperative functions may be executed for the individual users in order. For example, the order in which cooperative functions are executed is determined in accordance with the order of touch. Specifically, it is assumed that a user α touches the robot A1, subsequently a user β touches the robot A1, and subsequently the user α touches the robot A2. In this case, the individual users are identified, so that the specifying unit 56 recognizes that the robots A1 and A2 have been touched by the user α and that the robot A1 has been touched by the user β. In this case, the specifying unit 56 refers to the cooperative function management table, thereby specifying a cooperative function that is executable with use of the robots A1 and A2 touched by the user α. The robots A1 and A2 execute the cooperative function. The cooperative function is executed for the user α. If the user β touches the robot A2 while the cooperative function is being executed, the specifying unit 56 specifies a cooperative function that is executable with use of the robots A1 and A2 touched by the user β. The robots A1 and A2 execute the cooperative function for the user β after the execution of the cooperative function for the user α has finished. In this way, if plural users touch the same devices or the same portions, a cooperative function for the user who touches the devices or portions first is executed, and then a cooperative function for the user who touches the devices or portions next is executed. Execution instruction information is not necessarily transmitted from the server 14 to the individual devices, but information about a cooperative function for each user may be displayed on the terminal apparatus 16 of the user. In this case, cooperative functions are executed in accordance with the order in which execution instructions are provided to the devices.

Modification Example 3

A cooperative function to be executed or a cooperative function to be displayed may be changed in accordance with the position of a user who touches a device. For example, cooperative function management tables for individual positions of a user are created in advance and stored in the server 14. For example, if the user carries the terminal apparatus 16, the position of the terminal apparatus 16 is specified as the position of the user by using the Global Positioning System (GPS). The server 14 obtains position information of the terminal apparatus 16 from the terminal apparatus 16 carried by the user who has touched a device and refers to the cooperative function management table related to the position information, thereby specifying a cooperative function. In this way, a cooperative function is changed in accordance with the position of the user. For example, in a case where the same touch operation is performed on a device, a cooperative function that is expected to be desired by the user may vary between inside and outside an office. As a result of changing a cooperative function in accordance with the position of the user, a cooperative function that satisfies the demand of the user may be provided.

Modification Example 4

The specifying unit 56 of the server 14 may specify a cooperative function that uses a device touched by a user within a predetermined limited period of time. The starting point of the limited period of time may be, for example, a point of time when the user touches a first device or may be a point of time designated by the user. If plural devices or plural portions are touched by the user within the limited period of time after the starting point, the specifying unit 56 refers to the cooperative function management table, thereby specifying a cooperative function that is executable with use of the plural devices or plural portions touched within the limited period of time. On the other hand, if one device or one portion is touched by the user within the limited period of time, the specifying unit 56 refers to the single-device function management table, thereby specifying a single-device function of the device or a single-device function assigned to the portion. The process performed thereafter is the same as in the above-described exemplary embodiment. For example, if the user touches only the robot A1, a single-device function is executed by the robot A1. In this case, for example, the robot A1 greets the user. According to modification example 4, switching between a cooperative function and a single-device function to be executed or displayed may be performed.

Modification Example 5

If plural devices or plural portions that are within a predetermined area are touched by a user, the specifying unit 56 may specify a cooperative function that is executable with use of the plural devices or the plural portions. The area is, for example, an office, a store, an entrance, a meeting room, an open space, a playground, a library, or the like. For example, if plural devices or plural portions that are within the same area are touched by the user, a cooperative function that is executable with use of the plural devices or the plural portions is executed or displayed. Accordingly, a cooperative function that uses the devices that are within the same area may be executed. If plural devices or plural portions that are within different areas are touched by the user, a cooperative function that is executable with use of the plural devices or the plural portions may be executed or displayed. Accordingly, a cooperative function may be executed over plural areas.

Modification examples 4 and 5 may be combined. For example, if plural devices or plural portions that are within a specific area are touched by a user within a limited period of time, a cooperative function that is executable with use of the plural devices or the plural portions is specified. If one device or one portion is touched by the user within a limited period of time, a function of the device or a function assigned to the portion is specified as a single-device function.

Modification Example 6

Each device may be provided with a contact portion for cancelling (invalidating) a touch by a user (for example, a cancel button). For example, if the user touches a certain device and then presses a cancel button provided on the device, information indicating that the touch on the device is cancelled is transmitted from the device to the server 14. Upon receipt of the cancel information, the specifying unit 56 of the server 14 excludes the device from the devices that cooperate with each other, while regarding that the device is not touched by the user. For example, if the cancel button is pressed within a predetermined period of time from when the user touches the device, the cancellation may be validated (the touch may be invalidated). If the cancel button is pressed after the predetermined period of time elapses, the cancellation may be invalidated (the touch may be validated).

Alternatively, the validity or invalidity of cancellation may be determined according to the length of time over which the user touches a device. For example, in a case where the user touches a device and then touches the device again, if the user is in touch with the device for a predetermined period of time or more during the second touch, it is determined that cancellation is valid. That is, if a so-called press-and-hold is detected during the second touch after the first touch, it is determined that cancellation is valid. Alternatively, if the user touches the same portion of a device twice, the touch on the portion may be cancelled.

Modification Example 7

A cooperative function to be executed or a cooperative function to be displayed may be changed in accordance with a manner in which a device or portion is touched. For example, pressure sensors may be provided at individual portions of a device, and a pressure of a touch on each portion by a user may be detected. For example, cooperative functions for individual pressures are registered for each device or each portion in a cooperative function management table. The specifying unit 56 of the server 14 specifies, in the cooperative function management table, a cooperative function corresponding to a detection result obtained by a pressure sensor at a touched device or portion. For example, in a case where the same portion is touched, a cooperative function may be changed in accordance with the pressure of the touch (for example, a strong or weak grasp). According to modification example 7, in a case where a user touches the same device or the same portion, a cooperative function may be changed in accordance with the manner of the touch. Examples of the manner of touch include stroking, scrubbing, flicking, tapping, and so forth, and a cooperative function may be changed in accordance with each manner.

In a case where a touch is detected, the touch may be determined to be valid if the pressure of the touch is larger than or equal to a predetermined threshold, and the touch may be determined to be invalid if the pressure of the touch is smaller than the threshold. The specifying unit 56 of the server 14 specifies a cooperative function that is executable with use of the device or portion at which a valid touch is detected.

A cooperative function to be executed may be changed in accordance with the number of touches on the same portion. For example, cooperative functions for the individual numbers of touches within a predetermined period of time are registered for each device or each portion in a cooperative function management table. The specifying unit 56 specifies, in the cooperative function management table, a cooperative function corresponding to the number of touches. For example, a point of time when the user touches a certain portion for the first time is determined to be a starting point, and a sensor detects the number of times the user touches the portion from the starting point to the point of time when the predetermined period of time elapses. The specifying unit 56 specifies, in the cooperative function management table, a cooperative function that is associated with the portion and is associated with the number of touches. Accordingly, in a case where the user touches the same portion, a cooperative function may be changed in accordance with the number of touches.

Modification Example 8

A cooperative function to be executed or displayed may be changed in accordance with a position where a device is installed. The specifying unit 56 of the server 14 obtains position information of each device by using a GPS function. For example, if a home position (for example, a position where a device is located or accommodated when the device is not performing a process) is set for each device, a cooperative function is changed in accordance with the position relationship between the device touched by the user and its home position. For example, if the device is within a range predetermined based on the home position (for example, if the device is within a predetermined distance from the home position) and if the user touches the device, the specifying unit 56 specifies a cooperative function that is executable with use of the device. In this case, the specified cooperative function is executed or displayed. On the other hand, if the device is not within the foregoing range and if the user touches the device, a cooperative function that is executable with use of the device is not executed or displayed, and the device returns to the home position. If the device is a self-propelled device, the device moves itself to return to the home position. If the device is not a self-propelled device, the device may output, to the user, a message or the like for requesting the user to return the device to the home position.

Modification Example 9

A cooperative function to be executed or displayed may be changed in accordance with an environment where a device is installed. For example, various environment sensors, such as a temperature sensor, a humidity sensor, and a wind force sensor, are installed in the device or around the device, and environment information, such as temperature, humidity, and wind force, is collected by these sensors. Cooperative functions for individual environments (for example, for individual temperatures, individual humidities, or individual wind forces) are registered for each device or each portion in a cooperative function management table. The specifying unit 56 of the server 14 specifies, in the cooperative function management table, a cooperative function corresponding to the environment around a touched device or portion. For example, in a case where the user touches the same portion of the same device, a first cooperative function is specified if the humidity at the time of touch is higher than or equal to a threshold, and a second cooperative function different from the first cooperative function is specified if the humidity at the time of touch is lower than the threshold. For example, if the humidity is high, a cooperative function suitable for the high humidity may be specified. If the humidity is low, a cooperative function suitable for the low humidity or a cooperative function that may be executed without considering humidity may be specified. According to modification example 9, in a case where the user touches the same device or the same portion, a cooperative function may be changed in accordance with the environment at the time of touch.

Modification Example 10

A cooperative function to be executed or displayed may be changed in accordance with a status of a device. The status of the device is, for example, a status in which the device is executing a process, a standby status (a status in which the device is able to normally execute a process but is not actually executing the process), a failure status (a status in which the device is unable to execute a process), or the like. For example, cooperative functions for individual statuses (for example, a status in which a process is in progress, a standby status, or a failure status) are registered for each device or portion in a cooperative function management table. If a user touches a device, the device transmits information representing the status of the device at the time of touch to the server 14. Accordingly, the specifying unit 56 of the server 14 identifies the status of the device touched by the user. For example, if the device is in a failure status, the specifying unit 56 specifies a cooperative function corresponding to the failure status in the cooperative function management table. Hereinafter, specific examples will be described.

For example, it is assumed that the robot A1 is in a failure status and the robot A2 is in a standby status. If the user touches the robot A1, the robot A1 transmits, to the server 14, status information indicating that the robot A1 is in a failure status together with the device identification information and the address information of the robot A1. Upon receipt of the status information, the specifying unit 56 of the server 14 recognizes, based on the status information, that the robot A1 is in a failure status. If the user touches the robot A2, the robot A2 transmits, to the server 14, status information indicating that the robot A2 is in a standby status together with the device identification information and the address information of the robot A2. Upon receipt of the status information, the specifying unit 56 of the server 14 recognizes, based on the status information, that the robot A2 is in a standby status. In this case, the specifying unit 56 specifies a cooperative function that is executable with use of the robots A1 and A2 and that corresponds to the statuses of the robots A1 and A2. In this case, the specifying unit 56 specifies a cooperative function in which the robot A2 in a standby status maintains the robot A1 in a failure status. The information representing an execution instruction to execute the maintenance function as a cooperative function includes information representing the maintenance function, the pieces of device identification information of the robots A1 and A2, and the pieces of address information of the robots A1 and A2, and the execution instruction information is transmitted from the server 14 to the robots A1 and A2. In response to receipt of the execution instruction information, the robot A2 moves to the robot A1 and maintains the robot A1. For example, the robot A2 analyzes the cause of the failure and performs a process (repairing) in accordance with the cause.

For another example, it is assumed that a paper jam occurs in the MFP C and the robot A1 is in a standby status. If the user touches the MFP C, the MFP C transmits, to the server 14, status information indicating that a paper jam has occurred in the MFP C together with the device identification information and the address information of the MFP C. Upon receipt of the status information, the specifying unit 56 of the server 14 recognizes, based on the status information, that a paper jam has occurred in the MFP C. If the user touches the robot A1, the robot A1 transmits, to the server 14, status information indicating that the robot A1 is in a standby status together with the device identification information and the address information of the robot A1. Upon receipt of the status information, the specifying unit 56 of the server 14 recognizes, based on the status information, that the robot A1 is in a standby status. In this case, the specifying unit 56 specifies a cooperative function that is executable with use of the MFP C and the robot A1 and that corresponds to the statuses of the MFP C and the robot A1. In this case, the specifying unit 56 specifies a cooperative function in which the robot A1 in a standby status clears the paper jam in the MFP C. The information representing an execution instruction to execute the paper jam clearing function as a cooperative function includes information representing the paper jam clearing function, the pieces of device identification information of the MFP C and the robot A1, and the pieces of address information of the MFP C and the robot A1, and the execution instruction information is transmitted from the server 14 to the MFP C and the robot A1. In response to receipt of the execution instruction information, the robot A1 moves to the MFP C and clears the paper jam in the MFP C.

At least two modification examples among modification examples 1 to 10 described above may be combined.

Each of the devices 10 and 12, the server 14, and the terminal apparatus 16 that have been described above is implemented by, for example, cooperation between hardware and software. Specifically, each of the devices 10 and 12, the server 14, and the terminal apparatus 16 includes one or plural processors, such as a central processing unit (CPU), which are not illustrated. When the one or plural processors read and execute a program stored in a storage apparatus, which is not illustrated, the functions of the individual units of the devices 10 and 12, the server 14, and the terminal apparatus 16 are implemented. The program is stored in the storage apparatus via a recording medium, such as a compact disc (CD) or a digital versatile disc (DVD), or through a communication path, such as a network. For another example, the individual units of each of the devices 10 and 12, the server 14, and the terminal apparatus 16 may be implemented by hardware resources, such as a processor, an electronic circuit, or an application specific integrated circuit (ASIC). A device such as a memory may be used for the implementation. For still another example, the individual units of each of the devices 10 and 12, the server 14, and the terminal apparatus 16 may be implemented by a digital signal processor (DSP), a field programmable gate array (FPGA), or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a controller that controls, in accordance with a touch on one or a plurality of devices by a user, execution of a cooperative function that uses the one or plurality of devices.

2. The information processing apparatus according to claim 1, wherein the controller changes the cooperative function in accordance with an order in which the plurality of devices are touched.

3. The information processing apparatus according to claim 1, wherein the controller controls execution of the cooperative function that uses a portion touched by the user, the portion being a portion of the one or plurality of devices.

4. The information processing apparatus according to claim 3, wherein if the user touches a plurality of portions of the one or plurality of devices, the controller changes the cooperative function in accordance with an order in which the plurality of portions are touched.

5. The information processing apparatus according to claim 1, wherein the controller changes the cooperative function for each user.

6. The information processing apparatus according to claim 1, wherein the controller changes the cooperative function in accordance with a position of the user.

7. The information processing apparatus according to claim 1, wherein the controller controls execution of the cooperative function that uses a device touched by the user within a predetermined period of time.

8. The information processing apparatus according to claim 7, wherein if the user touches one device within the predetermined period of time, the controller controls execution of a function that uses the one device.

9. The information processing apparatus according to claim 1, wherein if the user touches the one or plurality of devices existing within a predetermined area, the controller controls execution of the cooperative function.

10. The information processing apparatus according to claim 1, wherein each of the one or plurality of devices includes a contact portion for invalidating a touch by the user.

11. The information processing apparatus according to claim 1, wherein the controller changes the cooperative function in accordance with a manner in which the user touches the one or plurality of devices.

12. The information processing apparatus according to claim 1, wherein the controller changes the cooperative function in accordance with a position of the one or plurality of devices.

13. The information processing apparatus according to claim 1, wherein the controller changes the cooperative function in accordance with an environment of a location where the one or plurality of devices are installed.

14. The information processing apparatus according to claim 1, wherein the controller changes the cooperative function in accordance with a status of the one or plurality of devices.

15. The information processing apparatus according to claim 1, wherein the controller performs, as control of execution of the cooperative function, control of display of the cooperative function.

16. A non-transitory computer readable medium storing a program causing a computer to execute a process, the process comprising:
controlling, in accordance with a touch on one or a plurality of devices by a user, execution of a cooperative function that uses the one or plurality of devices.

17. An information processing apparatus comprising:
control means for controlling, in accordance with a touch on one or a plurality of devices by a user, execution of a cooperative function that uses the one or plurality of devices.

* * * * *